(12) United States Patent
Kanou et al.

(10) Patent No.: US 11,356,035 B2
(45) Date of Patent: **\*Jun. 7, 2022**

(54) POWER TRANSMITTING APPARATUS FOR CODE MODULATION AND POWER RECEIVING APPARATUS FOR CODE DEMODULATION

(71) Applicant: Panasonic Intellectual Property Management Co., Ltd., Osaka (JP)

(72) Inventors: Junichi Kanou, Osaka (JP); Masahiro Yamaoka, Osaka (JP); Akira Minegishi, Osaka (JP); Atsushi Yamamoto, Kyoto (JP); Kohei Masuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1128 days.

This patent is subject to a terminal disclaimer.

(21) Appl. No.: 15/295,234

(22) Filed: Oct. 17, 2016

(65) Prior Publication Data

US 2017/0133948 A1 May 11, 2017

(30) Foreign Application Priority Data

Nov. 6, 2015 (JP) .............................. JP2015-218871

(51) Int. Cl.
  *H02M 7/537* (2006.01)
  *H04B 3/54* (2006.01)
  (Continued)

(52) U.S. Cl.
  CPC ............... *H02M 7/537* (2013.01); *H02J 3/14* (2013.01); *H02J 4/00* (2013.01);
  (Continued)

(58) Field of Classification Search
  CPC ............... H02J 13/0003; H02J 13/0024; H02J 13/0027; H02J 3/14; H02J 4/00;
  (Continued)

(56) References Cited

U.S. PATENT DOCUMENTS 2,955,265 A 10/1960 Lindsay
6,278,357 B1 * 8/2001 Croushore ............... H04B 3/54
340/534
(Continued)

FOREIGN PATENT DOCUMENTS

EP 2216246 A2 8/2010
GB 2515358 A 12/2014
(Continued)

OTHER PUBLICATIONS

The Extended European Search Report dated Mar. 24, 2017 for the related European Patent Application No. 16195356.7.

*Primary Examiner* — Harry R Behm
(74) *Attorney, Agent, or Firm* — McDermott Will & Emery LLP

(57) ABSTRACT

A power transmitting apparatus includes: a converter which converts an input power into an AC power with a predetermined frequency; and a first code modulator which code-modulates at least part of the AC power with a first modulation code to generate a first code-modulated power.

18 Claims, 19 Drawing Sheets

(51) Int. Cl.
*H02J 3/14* (2006.01)
*H02J 4/00* (2006.01)
*H02J 13/00* (2006.01)

(52) U.S. Cl.
CPC .......... *H02J 13/00009* (2020.01); *H04B 3/54* (2013.01); *Y02B 70/3225* (2013.01); *Y04S 20/222* (2013.01)

(58) Field of Classification Search
CPC ...... H02J 1/06; H02J 1/08; H02J 13/14; H02J 7/537; H02M 7/537; H04B 3/54; H04B 1/38; H04B 3/542; H04N 21/43615; H04N 21/44231
See application file for complete search history.

(56) References Cited

U.S. PATENT DOCUMENTS

| | | | |
|---|---|---|---|
| 6,624,532 | B1 | 9/2003 | Davidow et al. |
| 10,418,823 | B2 * | 9/2019 | Kanou ................ H02J 4/00 |
| 10,468,960 | B2 * | 11/2019 | Nishimoto ........ H02J 13/00007 |
| 2003/0214366 | A1 | 11/2003 | Robison et al. |
| 2008/0253277 | A1 * | 10/2008 | Lee .................... H04L 27/2647 370/203 |
| 2008/0298104 | A1 * | 12/2008 | Sachdeva ................ H02M 7/49 363/98 |
| 2009/0304101 | A1 | 12/2009 | LoPorto et al. |
| 2010/0256833 | A1 | 10/2010 | Luo |
| 2012/0173035 | A1 | 7/2012 | Abe |
| 2012/0185708 | A1 | 7/2012 | Rekimoto et al. |
| 2013/0226484 | A1 | 8/2013 | Rouvala et al. |
| 2014/0321341 | A1 * | 10/2014 | Kristiansen ......... E21B 33/0355 370/297 |
| 2014/0341235 | A1 * | 11/2014 | Tagashira ............... H04B 1/707 370/479 |
| 2015/0263525 | A1 | 9/2015 | Fornage |
| 2016/0006591 | A1 * | 1/2016 | Huomo .................. H04B 3/542 375/295 |
| 2016/0241891 | A1 * | 8/2016 | Ninomiya .......... H04N 21/2343 |
| 2017/0117913 | A1 * | 4/2017 | Yamamoto .......... H03M 1/0617 |

FOREIGN PATENT DOCUMENTS

| | | |
|---|---|---|
| JP | 2010-535009 | 11/2010 |
| JP | 2011-036080 | 2/2011 |
| JP | 2011-091954 | 5/2011 |
| JP | 2012-010530 | 1/2012 |
| JP | 2013-099215 | 5/2013 |
| JP | 2013-138612 | 7/2013 |
| JP | 2014-161226 A | 9/2014 |

* cited by examiner

POWER TRANSMITTING APPARATUS FOR CODE MODULATION AND POWER RECEIVING APPARATUS FOR CODE DEMODULATION

BACKGROUND

1. Technical Field

The present disclosure relates to a power transmitting apparatus, a power receiving apparatus, a controller, and a power transmission system including the power transmitting apparatus, the power receiving apparatus, and the controller.

2. Description of the Related Art

Recent years, there has been a proposal for introduction of local small-scale power networks from the viewpoint of reducing loss in long-distance power transmission. A power source (for example, a renewable energy power source) connected to such a power network has a tendency to have a power generation capacity which is smaller and more largely fluctuates than that of a major power source for a large-scale commercial power network. Against this background, there has been a demand for a power transmission system capable of transmitting and receiving powers with higher transmission efficiency in order to achieve stable and efficient use of energy in the small-scale power networks.

Japanese Patent No. 5612718 discloses a multi-terminal power converter for asynchronously interchanging powers among power systems.

Japanese Unexamined Patent Application Publication No. 2011-91954 discloses a power supplying apparatus which includes: a communication unit for transmitting and receiving information signals to and from other apparatuses; and a power supplying unit for supplying powers to the apparatuses.

SUMMARY

In one general aspect, the techniques disclosed here feature a power transmitting apparatus including: a converter which converts an input power into an AC power with a predetermined frequency; and a first code modulator which code-modulates at least part of the AC power with a first modulation code to generate a first code-modulated power.

It should be noted that comprehensive or specific embodiments may be implemented as a power receiving apparatus, a controller, a power transmission system, or a power transmission method.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
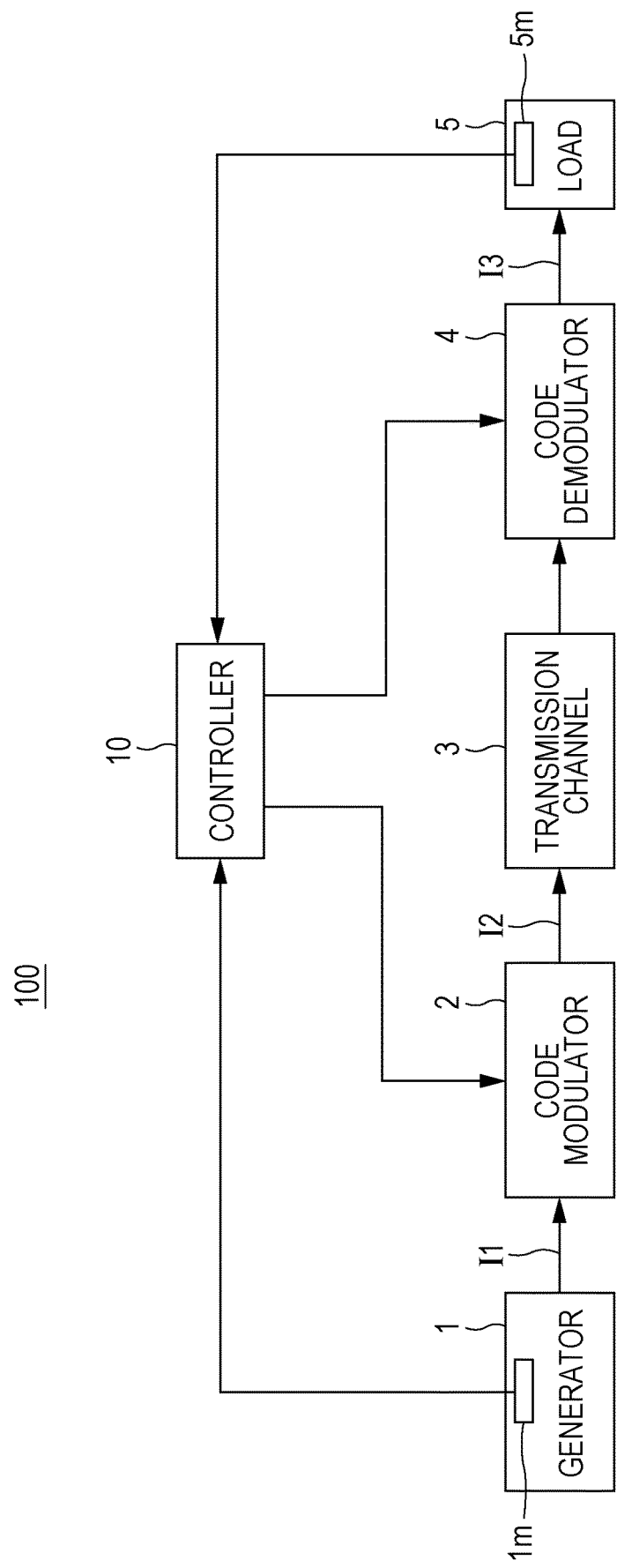
FIG. 1 is a block diagram showing a configuration example of a power transmission system according to a reference mode.

Referring to the drawings, descriptions will be hereinbelow provided for a reference mode and embodiments related to the disclosure. It should be noted that in the following reference mode and embodiments, similar components are denoted by the same reference signs and/or the same names.

The below-described reference mode and embodiments each offer a comprehensive or specific example. Numerical values, codes, waveforms, types of elements, arrangements and connections of elements, flows of signals, circuit blocks and the like are provided as examples, and are not intended to limit the disclosure. Furthermore, components not described in independent claims showing high-order concepts are optional components.

Reference Mode

[1. Power Transmission System]

FIG. 1 shows a configuration of a power transmission system 100 according to the reference mode. The power transmission system 100 includes a generator 1, a code modulator 2, a transmission channel 3, a code demodulator 4, a load 5, and a controller 10.

The generator 1 generates power (e.g. direct-current power). The code modulator 2 code-modulates the generated power using a modulation code, and thereby generates code-modulated power (i.e. a code-modulated wave). The code-modulated power is transmitted from the code modulator 2 to the code demodulator 4 via the transmission channel 3. The transmission channel 3 is a wired transmission line, for example. The code demodulator 4 code-demodulates the code-modulated power using a demodulation code, and thereby obtains power (e.g. direct-current power). The obtained power is supplied to the load 5, for example.

Each of the modulation code and the demodulation code is a signal representing a predetermined code sequence.

The code-modulated power is power of which a direction of a current is periodically or not periodically reversed, and/or of which a polarity of a voltage is periodically or not periodically inverted. The average of the current and/or the average of the voltage become almost equal to 0 (zero) over a sufficiently long time. The average of the current (or voltage) being almost equal to 0 (zero) means that after the code-modulation, the absolute value of the average of the current (or voltage) is less than a predetermined value. The predetermined value is, for example, a value obtained by dividing the maximum value of the current (or voltage) before the code-modulation by the code length of the modulation code. For example, the code-modulated power has a waveform representing changes in its polarity at each period (which is a multiple of an unit time by an integer, for example).

The generator 1 includes a power measuring instrument 1$m$, for example. The power measuring instrument 1$m$ measures the amount of power generated by the generator 1, and transmits it to the controller 10. The amount of generated power corresponds to the amount of power transmitted from the generator 1 to the code modulator 2, for example. Incidentally, the power measuring instrument 1$m$ may be provided on the pre-stage of the code modulator 2.

The load 5 includes a power measuring instrument 5$m$, for example. The power measuring instrument 5$m$ measures the amount of power consumed by the load 5, and transmits it to the controller 10. The amount of consumed power corresponds to the amount of power transmitted from the code demodulator 4 to the load 5, for example. Incidentally, the power measuring instrument 5$m$ may be provided on the post-stage of the code demodulator 4.

The generator 1 and the load 5 may be an electrical storage device such as a battery or a capacitor, for example. In this case, the generated power is stored during a time when the amount of consumed power is smaller, and the stored power can be used effectively. Thereby, the power efficiency of the system as a whole can be enhanced.

Based on the received amounts of power, the controller 10 controls the operations of the code modulator 2 and the code demodulator 4. For example, the controller 10 transmits instruction signals to the code modulator 2 and the code demodulator 4.

The instruction signals each may include synchronization signal for synchronizing the operation of the code modulator 2 and the operation of the code demodulator 4. The instruction signal for the code modulator 2 includes, for example, timing information for showing a timing at which to code-modulate the generated power. The instruction signal for the code demodulator 4 includes, for example, timing information for showing a timing at which to code-demodulate the code-modulated power. Thereby, the code-modulation and code-demodulation of the power can be synchronized accurately.

The instruction signal for the code modulator 2 includes, for example, code information on the modulation code, and the instruction signal for the code demodulator 4 includes, for example, code information on the demodulation code. In the present disclosure, the "code information" may be a code sequence itself, specification information for specifying a particular code sequence from multiple code sequences, or parameter information for generating a code sequence.

For example, the controller 10 may transmit the code sequence of the modulation code to the code modulator 2, and the code sequence of the demodulation code to the code demodulator 4.

For example, the configuration may be such that: the controller 10 transmits specification information for specifying the code sequence of the modulation code to the code modulator 2; and based on the specification information, the code modulator 2 generates the modulation code. The configuration may be such that: the controller 10 transmits specification information for specifying the code sequence of the demodulation code to the code demodulator 4; and based on the specification information, the code demodulator 4 generates the demodulation code.

Otherwise, the configuration may be such that: the modulation code is set in the code modulator 2 in advance; and the demodulation code is set in the code demodulator 4 in advance.

Let us assume a case where for example, the power transmission system 100 includes multiple generators 1, multiple code modulators 2, multiple code demodulators 4, and multiple loads 5. In this case, for example, the controller 10 transmits the code information on the modulation code to one selected from the multiple code modulators 2, and the code information on the demodulation code to one selected from the multiple code demodulators 4. Thereby, the power can be transmitted from the generator 1 connected to the selected code modulator 2 to the load 5 connected to the selected code demodulator 4.

It should be noted that FIG. 1 shows generated current I1, code-modulated current I2, and code-demodulated current I3 instead of the generated power, the code-modulated power, and the code-demodulated power. Although the following descriptions will be provided for a case where the currents are modulated and demodulated, the present disclosure is not limited to this. For example, the voltages may be modulated and demodulated. The "currents" in the following descriptions may be replaced with the "powers" or the "voltages" whenever deemed necessary.

[2. Transmission Efficiency of Code-Modulated Power]

Figure 2:
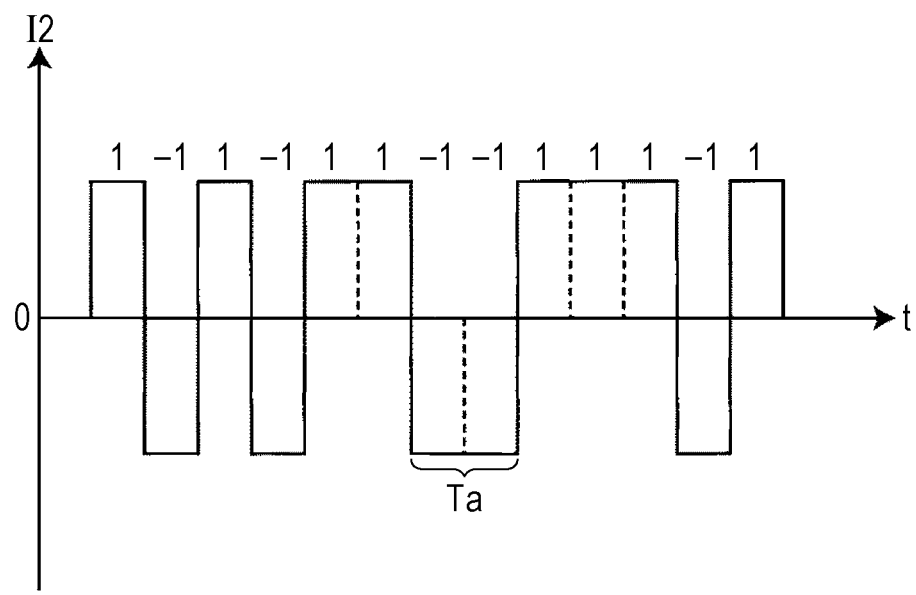
FIG. 2 is a diagram is showing an example of a waveform of a modulated current according to the reference mode.
Figure 3:
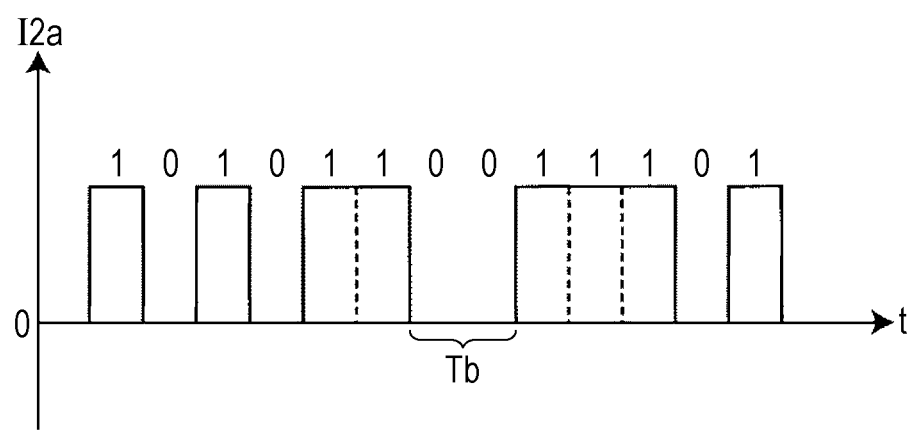
FIG. 3 is a diagram showing a waveform of a modulated current of a comparative example.

FIG. 2 shows an example of a waveform of the modulated current I2. Meanwhile, FIG. 3 shows an example of a waveform of modulated current I2$a$ of a comparative example. In FIG. 2, "1s" and "−1s" represent values constituting a modulation code, the values corresponding to the current values of the modulated current I2 in corresponding periods. In FIG. 3, "1s" and "0s" represent values constituting a demodulation code, the values corresponding to the current values of the modulated current I2a in corresponding periods. The code sequence expressed with "1s" and "0s" corresponds to typical modulation codes used for the communication system.

In the case shown in FIG. 2, the code modulator 2 converts the generated current I1 into a modulated wave (i.e. the modulated current I2) having "1s" and "−1s." Thus, positive current is transmitted from the code modulator 2 to the code demodulator 4 during each time period when the modulated current I2 shows "1," and negative current is transmitted from the code modulator 2 to the code demodulator 4 during each time period when the modulated current I2 shows "−1" (during Time Period Ta in FIG. 2, for example). Accordingly, the power is transmitted in all period, and high transmission efficiency can be obtained.

In the case shown in FIG. 3, the modulated current I2a is a modulated wave having "1s" and "0s." In this case, the modulated current I2a is at zero during each time period when the modulated current I2a shows "0" (during Time Period Tb in FIG. 3, for example), and no power is transmitted. Accordingly, the power transmission efficiency decreases.

The comparison between the cases shown in FIG. 2 and FIG. 3 tells that in the case where the code-modulated power selectively takes on the positive values and the negative values, particularly in the case where the code sequence of the modulation code does not include "0," the power can be transmitted with high transmission efficiency.

[3. Code Modulator and Code Demodulator]

Figure 4:
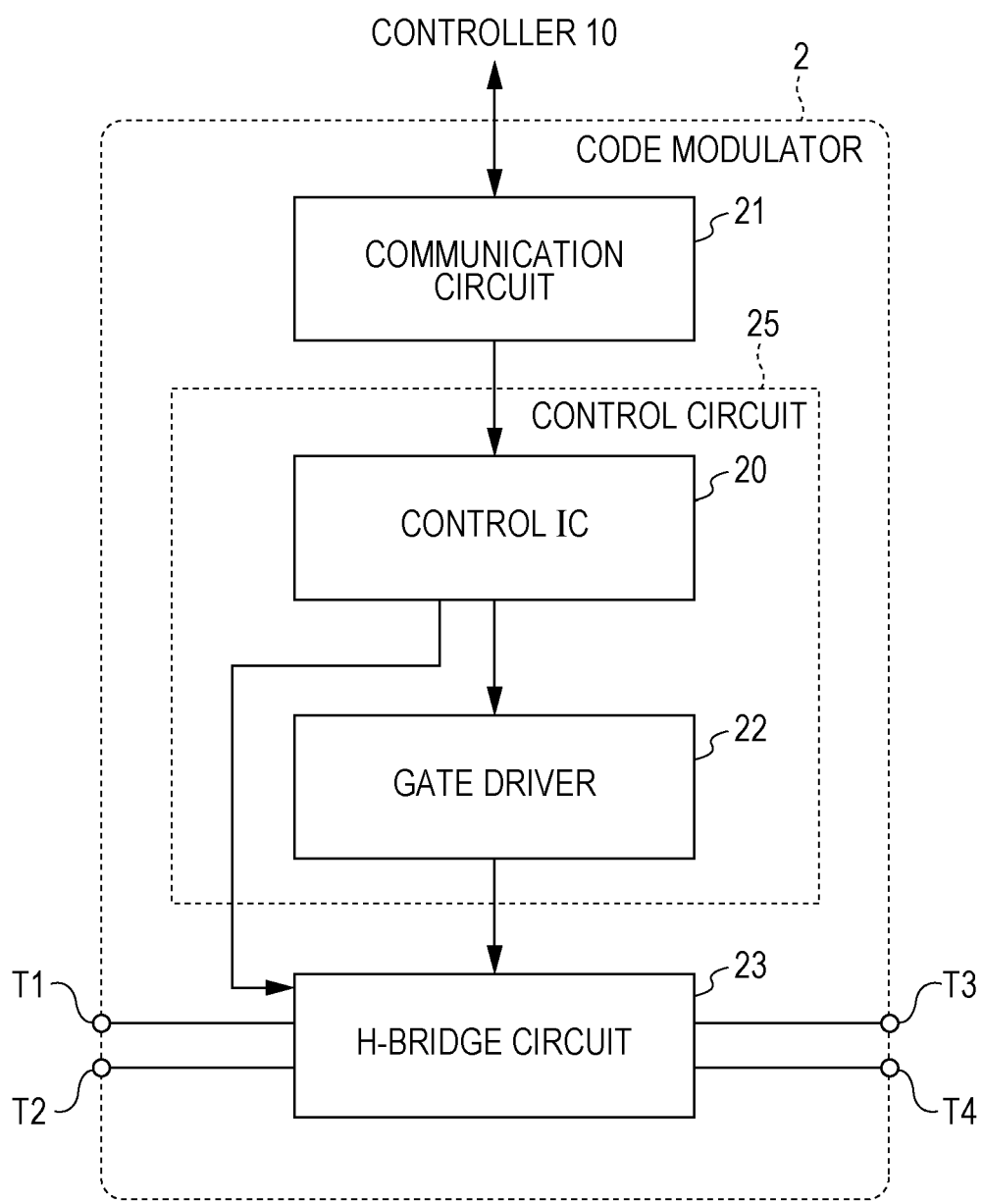
FIG. 4 is a block diagram showing an example of a configuration of a code modulator according to the reference mode.

FIG. 4 shows a configuration example of the code modulator 2.

In FIG. 4, the code modulator 2 includes a communication circuit 21, a control circuit 25, and an H-bridge circuit 23. The control circuit 25 includes a control IC 20 and a gate driver 22, for example.

The communication circuit 21 receives the instruction signal from the controller 10, and outputs it to the control IC 20. The communication circuit 21 includes an antenna, a tuning circuit, and a detector, for example.

The instruction signal includes the synchronization signal, and the code information on the modulation code, for example. The synchronization signal may be a trigger signal for starting the modulation, or a trigger signal for terminating the modulation, for example. Otherwise, the synchronization signal may be time information on a time at which to start the modulation, or time information on a time at which to terminate the modulation, for example. The trigger information and the time information are examples of the "timing information" in the present disclosure.

The control IC 20 generates the modulation code based on the instruction information, and makes the gate driver 22 generate a control signal according to the thus-generated modulation code. The control IC 20 includes a processor. The control IC 20 is a microcomputer, for example.

The gate driver 22 outputs the control signal to the H-bridge circuit 23, and thereby makes the H-bridge circuit 23 perform the code modulation operation.

The code modulator 2 includes input terminals T1, T2 connected to the generator 1, and output terminals T3, T4 connected to the transmission channel 3.

Figure 5:
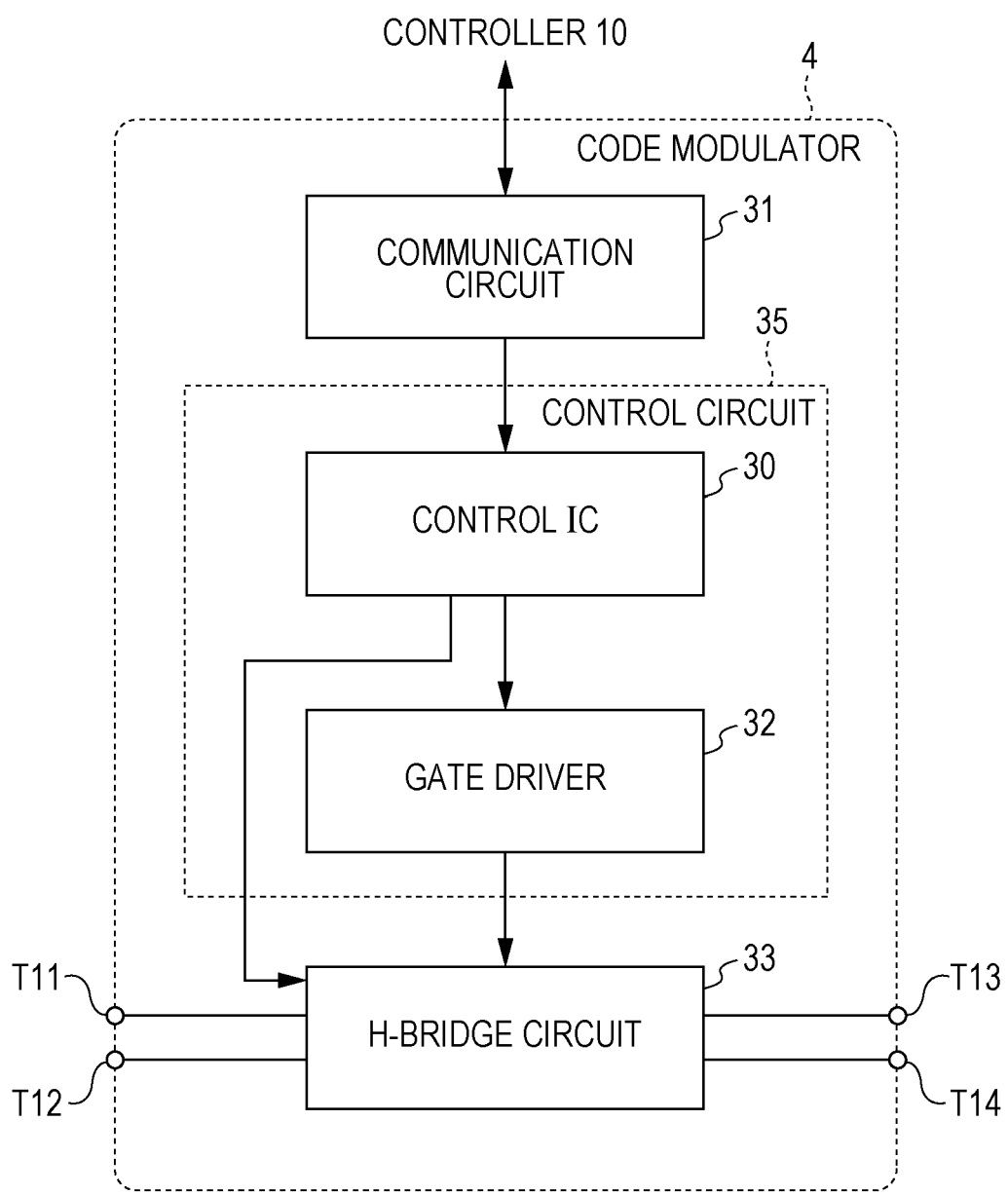
FIG. 5 is a block diagram showing an example of a configuration of a code demodulator according to the reference mode.

FIG. 5 shows a configuration example of the code demodulator 4.

In FIG. 5, the code demodulator 4 includes a communication circuit 31, a control circuit 35, and an H-bridge circuit 33. The control circuit 35 includes a control IC 30 and a gate driver 32, for example.

The communication circuit 31 receives the instruction signal from the controller 10, and outputs it to the control IC 30. The communication circuit 31 includes an antenna, a tuning circuit, and a detector, for example.

The instruction signal includes the synchronization signal, and the code information on the demodulation code, for example. The synchronization signal may be a trigger signal for starting the demodulation, or a trigger signal for terminating the demodulation, for example. Otherwise, the synchronization signal may be time information on a time at which to start the demodulation, or time information on a time at which to terminate the demodulation, for example. The trigger information and the time information are examples of the "timing information" in the present disclosure.

The control IC 30 generates the demodulation code based on the instruction information, and makes the gate driver 32 generate a control signal according to the thus-generated demodulation code. The control IC 30 includes a processor. The control IC 30 is a microcomputer, for example.

The gate driver 32 outputs the control signal to the H-bridge circuit 33, and thereby makes the H-bridge circuit 33 perform the code demodulation operation.

The code demodulator 4 includes input terminals T11, T12 connected to the transmission channel 3, and output terminals T13, T14 connected to the load 5.

In FIG. 1, the controller 10 transmits the control signals to the control modulator 2 and the control demodulator 4 using channels different from the transmission channel 3. Instead, however, the controller 10 may transmit the control signals to the code modulator 2 and the code demodulator 4 using the transmission channel 3. In this case, each control signal may be transmitted by being multiplexed with the code-modulated power. This multiplexed transmission makes it possible, for example, to eliminate the transmission channel from the controller 10 to the code modulator 2 and the code demodulator 4, and to reduce costs.

Figure 6:
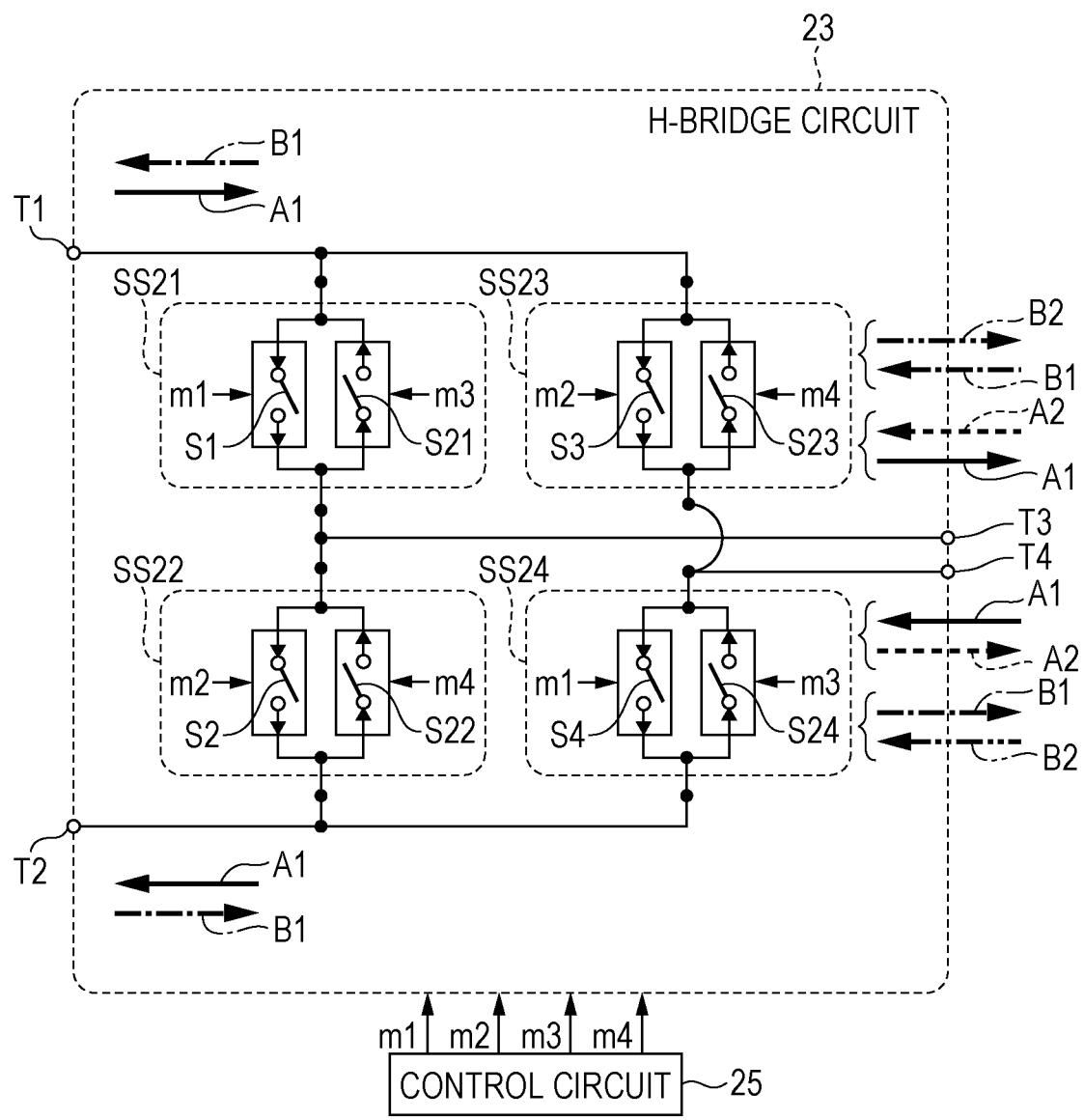
FIG. 6 is a schematic circuit diagram showing the example of the configuration of the code modulator according to the reference mode.

FIG. 6 shows configuration examples of the control circuit 25 and the H-bridge circuit 23 in the code modulator 2. The H-bridge circuit 23 includes four bi-directional switch circuits SS21 to SS24 which are connected in a full-bridge configuration. The control circuit 25 outputs code sequences m1 to m4 to the H-bridge circuit 23 as control signals.

The switch circuit SS21 includes a switch S1, and a switch S21 parallel-connected to the switch S1 in a direction reverse to that of the switch S1. The switch S1 and the switch S21 are turned on and off in response to the control signals m1, m3, respectively. The switch circuit SS22 includes a switch S2, and a switch S22 parallel-connected to the switch S2 in a direction reverse to that of the switch S2. The switch S2 and the switch S22 are turned on and off in response to the control signals m2, m4, respectively. The switch circuit SS23 includes a switch S3, and a switch S23 parallel-connected to the switch S3 in a direction reverse to that of the switch S3. The switch S3 and the switch S23 are turned on and off in response to the control signals m2, m4, respectively. The switch circuit SS24 includes a switch S4, and a switch S24 parallel-connected to the switch S4 in a direction reverse to that of the switch S4. The switch S4 and the switch S24 are turned on and off in response to the control signals m1, m3, respectively.

The switches S1 to S4 and the switches S21 to S24 are MOS transistors, for example.

The switches S1 to S4 and the switches S21 to S24 are in ON state while signals representing "1" are being inputted in them, and are in OFF state while signals representing "0" are being inputted in them, for example.

Figure 7:
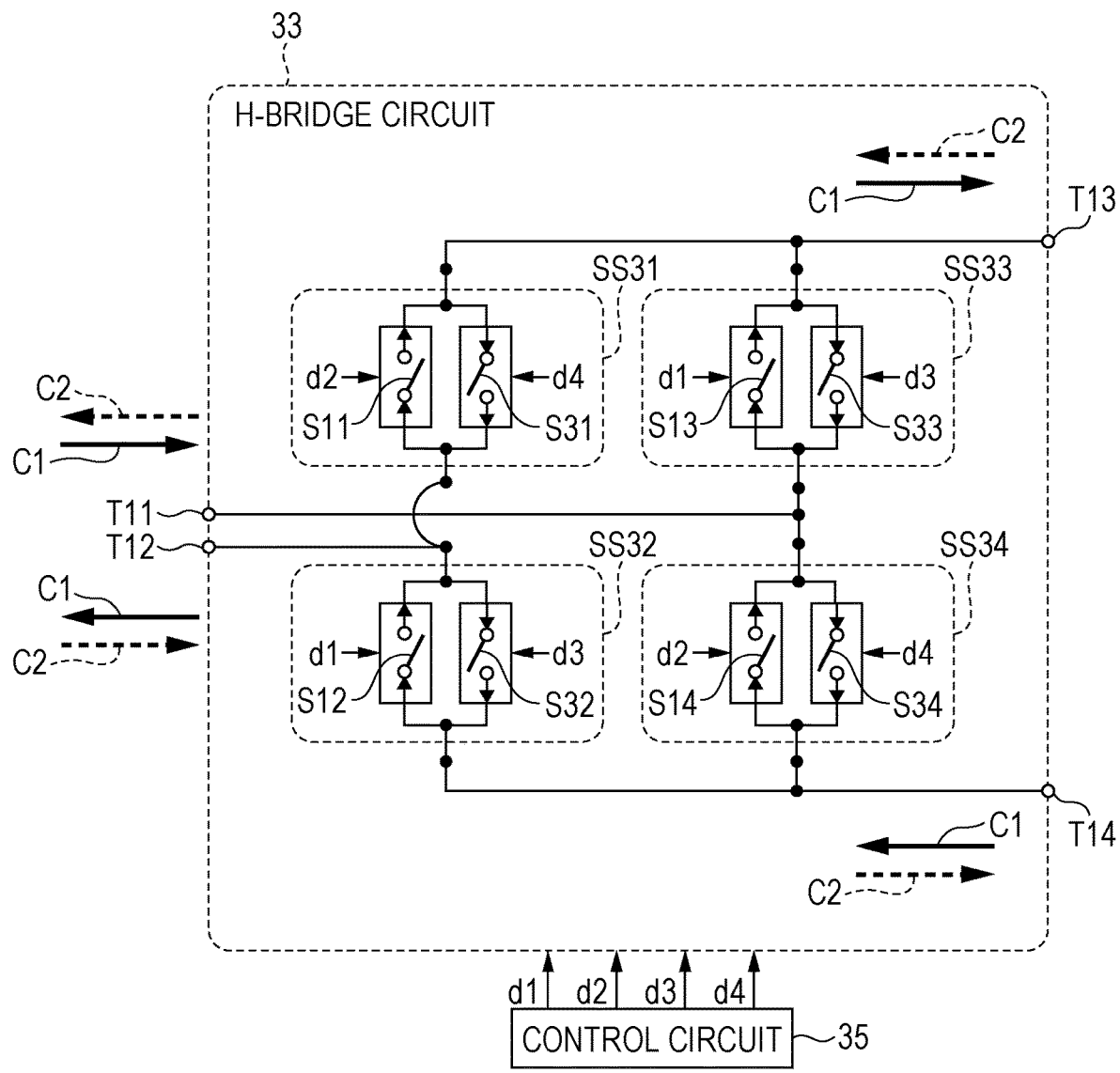
FIG. 7 is a schematic circuit diagram showing the example of the configuration of the code demodulator according to the reference mode.

FIG. 7 shows configuration examples of the control circuit 35 and the H-bridge circuit 33 in the code demodulator 4. The H-bridge circuit 33 includes four bi-directional switch circuits SS31 to SS34 which are connected in a full-bridge configuration. The control circuit 35 outputs code sequences d1 to d4 to the H-bridge circuit 33 as control signal.

The switch circuit SS31 includes a switch S11, and a switch S31 parallel-connected to the switch S11 in a direction reverse to that of the switch S11. The switch S11 and the switch S31 are turned on and off in response to the control signals d2, d4, respectively. The switch circuit SS32 includes a switch S12, and a switch S32 parallel-connected to the switch S12 in a direction reverse to that of the switch S12. The switch S12 and the switch S32 are turned on and off in response to the control signals d1, d3, respectively. The switch circuit SS33 includes a switch S13, and a switch S33 parallel-connected to the switch S13 in a direction reverse to that of the switch S13. The switch S13 and the switch S33 are turned on and off in response to the control signals d1, d3, respectively. The switch circuit SS34 includes a switch S14, and a switch S34 parallel-connected to the switch S14 in a direction reverse to that of the switch S14. The switch S14 and the switch S34 are turned on and off in response to the control signals d2, d4, respectively.

The switches S11 to S14 and the switches S31 to S34 are MOS transistors, for example.

The switches S11 to S14 and the switches S31 to S34 are in ON state while signals representing "1" are being inputted in them, and are in OFF state while signals representing "0" are being inputted in them, for example.

[4. Operation]

[4-1. Control Signals]

Table 1 shows examples of the code sequences represented by the control signals m1 to m4 to be inputted into the switches S1 to S4 and the switches S21 to S24 in the code modulator 2, and examples of the code sequences represented by the control signals d1 to d4 to be inputted into the switches S11 to S14 and the switches S31 to S34 in the code demodulator 4.

TABLE 1

| control signal | code sequence |
|---|---|
| m1 | [c1a c0] = [10111000000000] |
| m2 | [c1b c0] = [01000110000000] |
| m3 | [c0 c1a] = [00000001011100] |
| m4 | [c0 c1b] = [00000000100011] |
| d1 | [c1a c0] = [10111000000000] |
| d2 | [c1b c0] = [01000110000000] |
| d3 | [c0 c1a] = [00000001011100] |
| d4 | [c0 c1b] = [00000000100011] |

In this example, the code sequences represented by the control signals m1, m2, m3, m4 are the same as the code sequences represented by the control signals d1, d2, d3, d4, respectively. In Table 1, Code Sequence c1b are what is obtained by inverting all the bits in Code Sequence c1a. Code Sequence c0 is a code sequence in which all the bits are at "0." The time widths of the Code Sequences c1a, c1b, c0 each are equal to a half-cycle of the alternating-current generated current I1.

[4-2. Operation of Code Modulator]

Descriptions will be provided for how the code modulator 2 operates. The following descriptions are provided with an assumption that: the generated current I1 is positive in a first half-cycle (i.e. an early half of one cycle); and the generated current I1 is negative in a second half-cycle (i.e. a latter half of one cycle);

[4-2-1. Operation of Code Modulator During First Half-Cycles]

During first half-cycles, the switches S1 to S4 are turned on and off by the control signals m1, m2, and the switches S21 to S24 are held in OFF state.

While the control signal m1 is at "1" and the control signal m2 is at "0," the switches S1, S4 are in ON state and the switches S2, S3 are in OFF state. In this case, the positive generated current I1 flows in directions indicated with arrows A1 in FIG. 6. Thereby, the positive modulated current I2 flows through the terminals T3, T4. In other words, the generated current I1 is code-modulated with On the other hand, while the control signal m1 is at "0" and the control signal m2 is at "1," the switches S1, S4 are in OFF state and the switches S2, S3 are in ON state. During this time, the positive generated current I1 flows in directions indicated with arrows A2 in FIG. 6. Thereby, the negative modulated current I2 flows through the terminals T3, T4. In other words, the generated current I1 is code-modulated with "−1."

Thus, during the first half-cycles, the code modulator 2 outputs the modulated current I2 to the transmission channel 3 via the terminals T3, T4.

[4-2-2. Operation of Code Modulator During Second Half-Cycles]

During second half-cycles, the switches S1 to S4 are held in OFF state, and the switches S21 to S24 are turned on and off by the control signals m3, m4.

While the control signal m3 is at "1" and the control signal m4 is at "0," the switches S21, S24 are in ON state and the switches S22, S23 are in OFF state. In this case, the negative generated current I1 inputted into the code modulator 2 flows in directions indicated with arrows B1 in FIG. 6. Thereby, the negative modulated current I2 flows through the terminals T3, T4. In other words, the generated current I1 is code-modulated with "1."

On the other hand, while the control signal m3 is at "0" and the control signal m4 is at "1," the switches S21, S24 are in OFF state and the switches S22, S23 are in ON state. In this case, the negative generated current I1 inputted into the code modulator 2 flows in directions indicated with arrows B2 in FIG. 6. Thereby, the positive modulated current I2 flows through the terminals T3, T4. In other words, the generated current I1 is code-modulated with "−1."

Thus, during the second half-cycles, the code modulator 2 outputs the modulated current I2 to the transmission channel 3 via the terminals T3, T4 as well.

[4-2-3. Supplement]

The series of switching operations based on the control signals m1 to m4 in Table 1 corresponds to operations of code-modulating the generated current I1 with Modulation Code M1 given below:

M1=[1 −1 1 1 1 −1 −1 1 −1 1 1 1 −1 −1].

In Modulation Code M1, the number of "1s" is greater than the number of "−1s." However, the average of the modulated current I2 can be at 0. This is because: the generated current I1 is positive during the first half-cycles, and negative during the second half-cycles; and the partial sequence of the Modulation Code M1 during each first half-cycle is the same as the partial sequence of the Modulation Code M1 during each second half-cycle.

[4-3. Operation of Code Demodulator]

Descriptions will be provided for how the code demodulator 4 operates.

[4-3-1. Operation of Code Demodulator During First Half-Cycles]

During first half-cycles, the switches S11 to S14 are turned on and off by the control signals d1, d2, and the switches S31 to S34 are held in OFF state.

During first half-cycles, while the positive modulated current I2 is being inputted into the code demodulator 4, the control signal d1 is at "1" and the control signal d2 is at "0." In this case, the switches S12, S13 are in ON state and the switches S11, S14 are in OFF state. Thus, the positive modulated current I2 flows in directions indicated with arrows C1 in FIG. 7. Thereby, the positive demodulated current I3 flows through the terminals T13, T14. In other words, the modulated current I2 is code-demodulated with "1."

During first half-cycles, while the negative modulated current I2 is being inputted into the code demodulator 4, the control signal d1 is at "0" and the control signal d2 is at "1." In this case, the switches S12, S13 are in OFF state and the switches S11, S14 are in ON state. Thus, the negative modulated current I2 flows in directions indicated with the arrows C1 in FIG. 7. Thereby, the positive demodulated current I3 flows through the terminals T13, T14. In other words, the modulated current I2 is code-demodulated with "−1."

Thus, during the first half-cycles, the code demodulator 4 outputs the positive demodulated current I3 via the terminals T13, T14.

[4-3-2. Operation of Code Demodulator During Second Half-Cycles]

During second half-cycles, the switches S11 to S14 are held in OFF state, and the switches S31 to S34 are turned on and off by the control signals d3, d4.

During second half-cycles, while the positive modulated current I2 is being inputted into the code demodulator 4, the control signal d3 is at "1" and the control signal d4 is at "0." In this case, the switches S32, S33 are in ON state and the switches S31, S34 are in OFF state. Thus, the positive modulated current I2 flows in directions indicated with arrows C2 in FIG. 7. Thereby, the negative demodulated current I3 flows through the terminals T13, T14. In other words, the modulated current I2 is code-demodulated with "−1."

During second half-cycles, while the negative modulated current I2 is being inputted into the code demodulator 4, the control signal d3 is at "0" and the control signal d4 is at "1." In this case, the switches S32, S33 are in OFF state and the switches S31, S34 are in ON state. Thus, the negative modulated current I2 flows in directions indicated with arrows the C2 in FIG. 7. Thereby, the negative demodulated current I3 flows through the terminals T13, T14. In other words, the modulated current I2 is code-demodulated with "1."

Thus, during the second half-cycles, the code demodulator 4 outputs the negative demodulated current I3 via the terminals T13, T14. In other words, the code demodulator 4 generates the demodulated current I3 which is positive during first half-cycles and negative during second half-cycles, and its waveform almost agrees with that of the generated current I1.

[4-3-3. Supplement]

The series of switching operations based on the control signals d1 to d4 in Table 1 corresponds to operations of code-demodulating the modulated current I2 with Demodulation Code D1 given below:

D1=[1 −1 1 1 1 −1 −1 1 −1 1 1 1 −1 −1].

A product obtained by multiplying the modulated current I2 by Demodulation Code D1 equals a product obtained by multiplying the generated current I1 by a product of M1 and D1. In this respect, the product of M1 and D1 has a code sequence given below.

M1×D1=[1 1 1 1 1 1 1 1 1 1 1 1 1 1]

Accordingly, as the demodulated current I3, a DC current equivalent to the generated current I1 can be reproduced by the code modulation and the code demodulation.

[4-4. Waveform of Each Current]

Figure 8A:
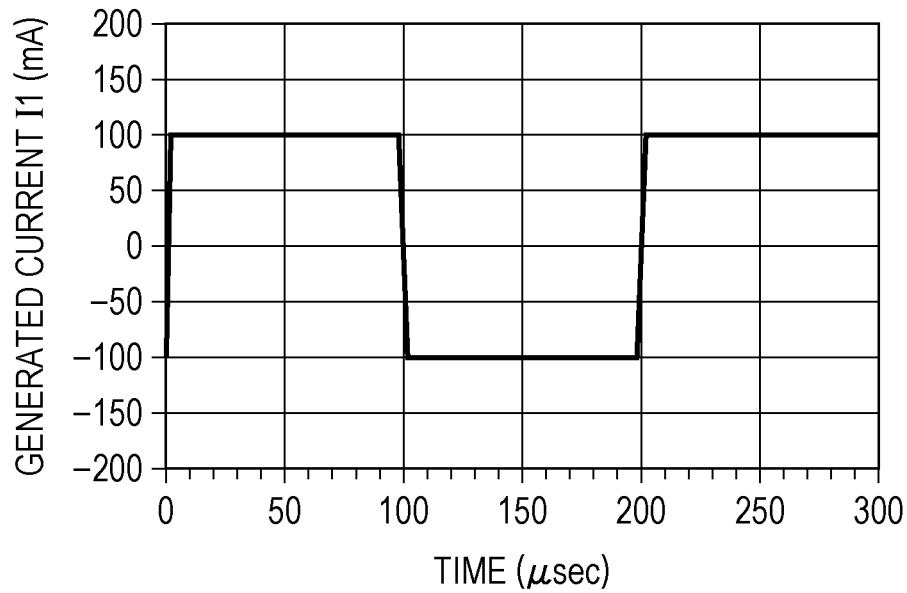
FIG. 8A is a diagram showing an example of a waveform of a generated current according to the reference mode.
Figure 8B:
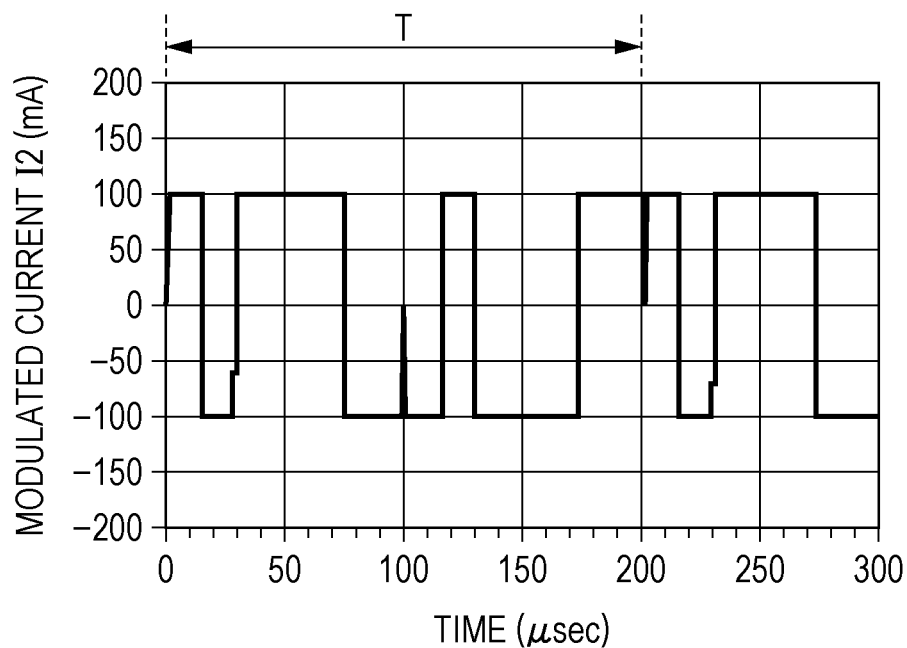
FIG. 8B is a diagram showing an example of a waveform of a modulated current according to the reference mode.
Figure 8C:
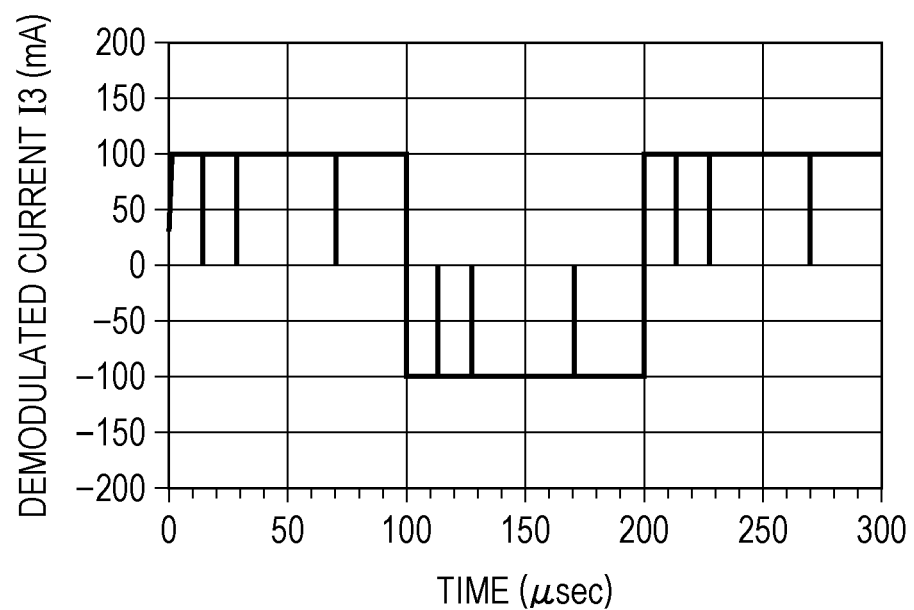
FIG. 8C is a diagram showing an example of a waveform of a demodulated current according to the reference mode.

FIGS. 8A to 8C respectively show examples of waveforms of the generated current I1, the modulated current I2 and the demodulated current I3.

The generated current I1 shown in FIG. 8A is an AC current at a frequency of 5 kHz, and with a rectangular waveform. The modulated current I2 shown in FIG. 8B is obtained by multiplying the generated current I1 by Modulation Code M1. The modulated current I2 shown in FIG. 8B selectively takes on positive and negative values. The demodulated current I3 shown in FIG. 8C is obtained by multiplying the modulated current I2 by Demodulation Code D1. The frequencies of Modulation Code M1 and Demodulation Code D1 both are 35 kHz. The time width of each value constituting the Modulation Code M1 is [1/(35 kHz)]/2=14.3 microseconds, and the time width of each value constituting the Demodulation Code D1 is also 14.3 microseconds. As shown in FIG. 8C, as the demodulated current I3, the AC current equivalent to the generated current I1 can be reproduced by the code modulation and the code demodulation.

[5. Modification of Operation]

Table 2 shows modified examples of the code sequences represented by the control signals m1 to m4 to be inputted into the switches S1 to S4 and the switches S21 to S24 in the code modulator 2, and modified examples of the code sequences represented by the control signals d1 to d4 to be inputted into the switches S11 to S14 and the switches S31 to S34 in the code demodulator 4.

TABLE 2

| control signal | code sequence |
| --- | --- |
| m1 | [c1a c1b] = [10111000100011] |
| m2 | [c1b c1a] = [01000111011100] |
| m3 | [c0 c0] = [00000000000000] |
| m4 | [c0 c0] = [00000000000000] |
| d1 | [c1a c1b] = [10111000100011] |
| d2 | [c1b c1a] = [01000111011100] |
| d3 | [c0 c0] = [00000000000000] |
| d4 | [c0 c0] = [00000000000000] |

The control signals m3, m4, d3, d4 shown in Table 2 hold the switches S21 to S24, S31 to S34 in OFF state. The control signals m1, m2, d1, d2 shown in Table 2 are capable of making the code modulator 2 and the code demodulator 4 modulate and demodulate the DC generated power.

Consequently, the code modulator 2 and the code demodulator 4 are capable of dealing with both the modulation/demodulation of the DC power and the modulation/demodulation of the AC power by changing the control signals.

[6. Modifications of Code Modulator and Code Demodulator]

Figure 9:
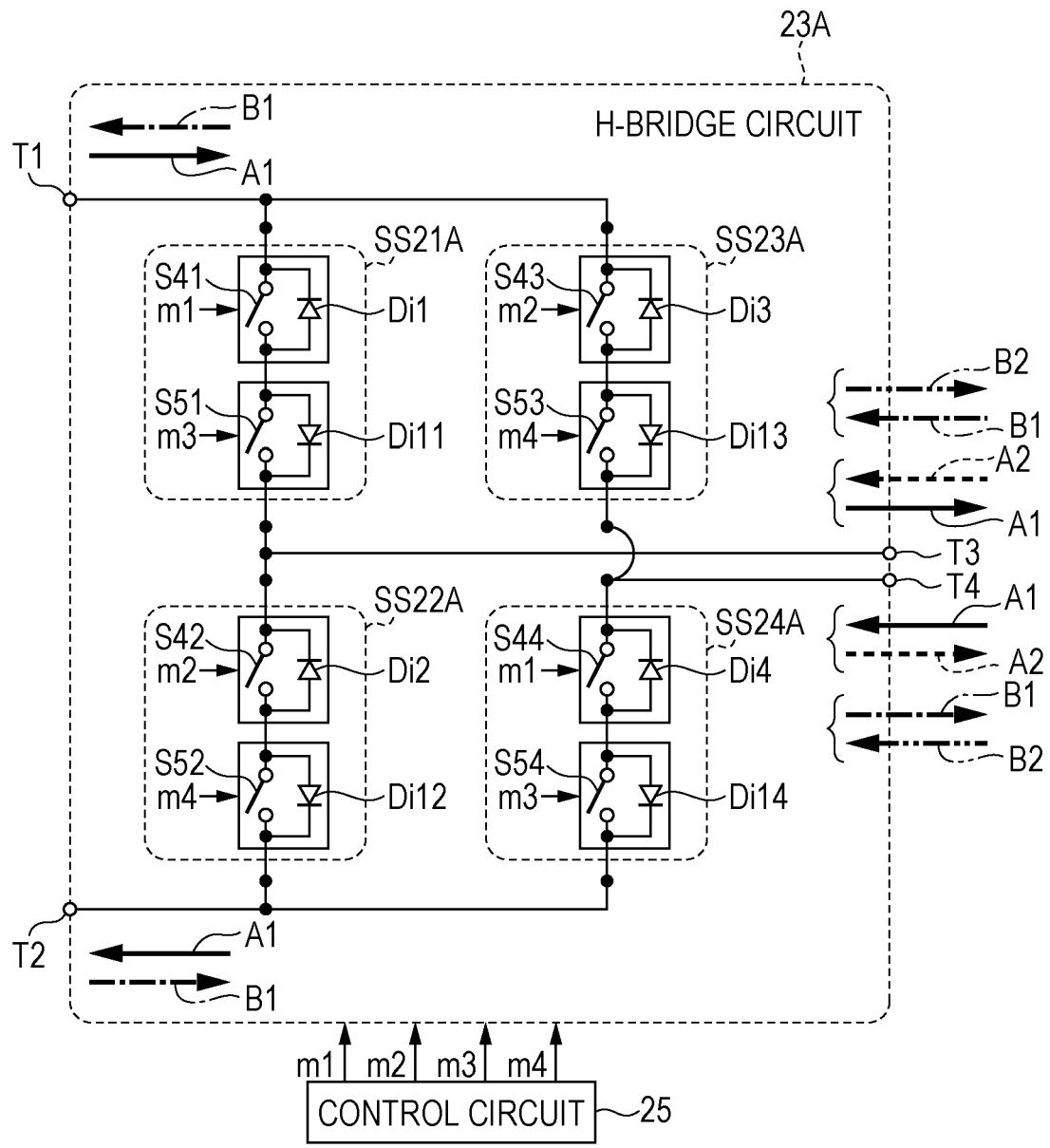
FIG. 9 is a schematic circuit diagram showing a configuration of a code modulator according to a modification of the reference mode.

FIG. 9 shows a modification of the H-bridge circuit 23 in the code modulator 2. The H-bridge circuit 23A shown in FIG. 9 includes bi-directional switch circuits SS21A to SS24A instead of the bi-directional switch circuits SS21 to SS24 shown in FIG. 6.

The bi-directional switch circuit SS21A includes a switch S41, a switch S51, a diode Di1, and a diode Di11. The switch S41 and the switch S51 are series-connected together. The diode Di1 is parallel-connected to the switch S41. The diode Di11 is parallel-connected to the switch S51. The diode Di1 allows the current to flow from the terminal T3 to the terminal T1. The diode Di11 allows the current to flow from the terminal T1 to the terminal T3. The bi-directional switch circuits SS22A to SS24A each have a structure similar to that of the bi-directional switch circuit SS21A. For this reason, descriptions for the bi-directional switch circuits SS22A to SS24A are omitted.

The control circuit 25 outputs the control signal m1 to the switches S41, S44, the control signal m2 to the switches S42, S43, the control signal m3 to the switches S51, S54, and the control signal m4 to the switches S52, S53. The control signals m1 to m4 may be those shown in Table 1, for example.

Figure 10:
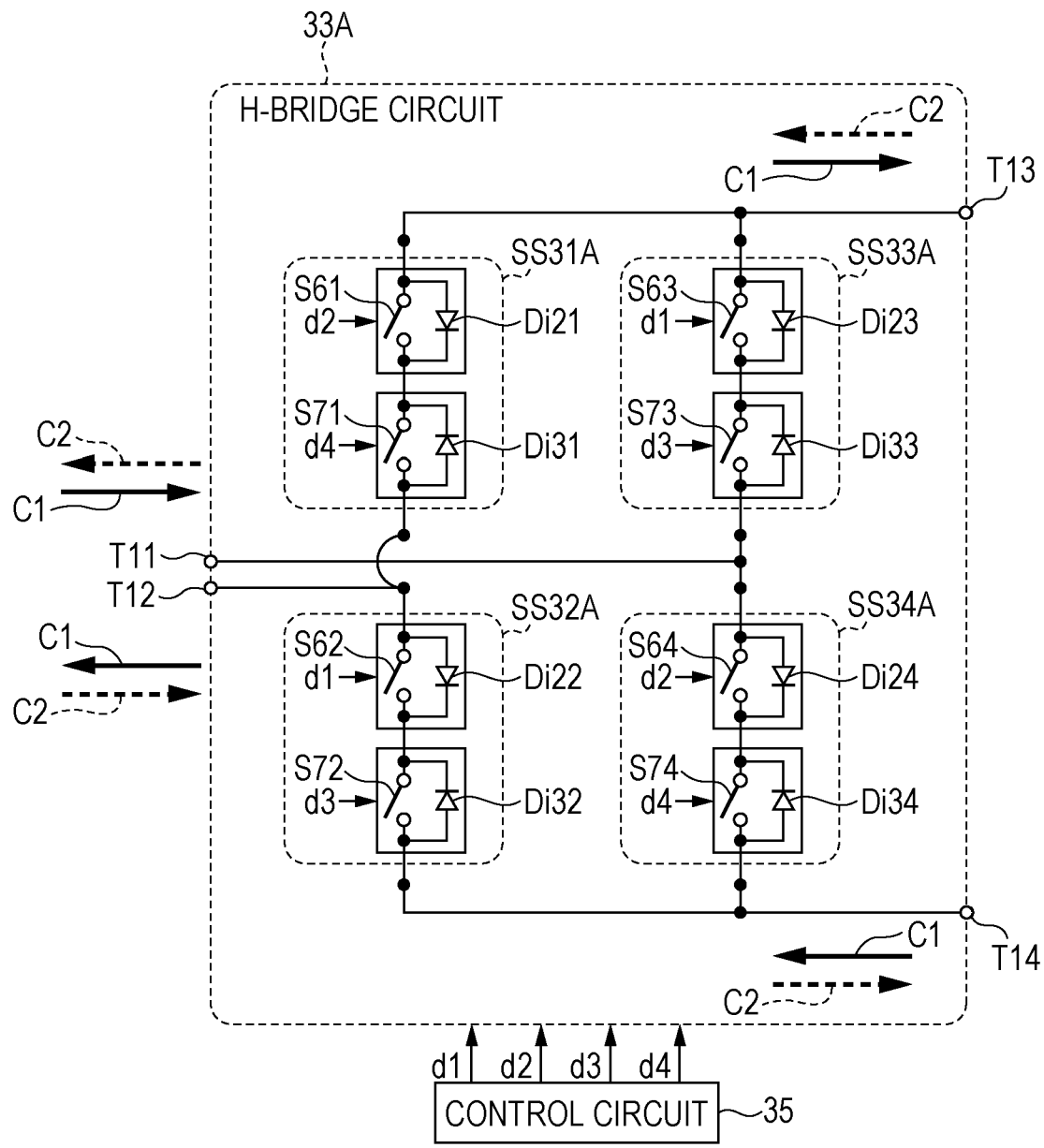
FIG. 10 is a schematic circuit diagram showing a configuration of a code demodulator according to the modification of the reference mode.

FIG. 10 shows a modification of the H-bridge circuit 33 in the code demodulator 4. The H-bridge circuit 33A shown in FIG. 10 includes bi-directional switch circuits SS31A to SS34A instead of the bi-directional switch circuits SS31 to SS34 shown in FIG. 7.

The bi-directional switch circuit SS31A includes a switch S61, a switch S71, a diode Di21, and a diode Di31. The switch S61 and the switch S71 are series-connected together. The diode Di21 is parallel-connected to the switch S61. The diode Di31 is parallel-connected to the switch S71. The diode Di21 allows the current to flow from the terminal T13 to the terminal T12. The diode Di31 allows the current to flow from the terminal T12 to the terminal T13. The bi-directional switch circuits SS32A to SS34A each have a structure similar to that of the bi-directional switch circuit SS31A. For this reason, descriptions for the bi-directional switch circuits SS32A to SS34A are omitted.

The control circuit 35 outputs the control signal d1 to the switches S62, S63, the control signal d2 to the switches S61, S64, the control signal d3 to the switches S72, S73, and the control signal d4 to the switches S71, S74. The control signals d1 to d4 may be those shown in Table 1, for example.

The switches S41 to S44, S51 to S54, S61 to S64, S71 to S74 may be MOS transistors, for example. In that case, the diodes Di1 to Di4, Di11 to Di14, Di21 to Di24, Di31 to Di34 may be body diodes in the corresponding MOS transistors, for example. This makes it possible to reduce the sizes of the bi-directional switch circuits SS21A to SS24A, SS31A to SS34A.

First Embodiment

Descriptions will be hereinbelow provided for what makes a first embodiment different from the reference mode.

[1. Power Transmission System]

[1-1. Configuration of Power Transmission System]

Figure 11:
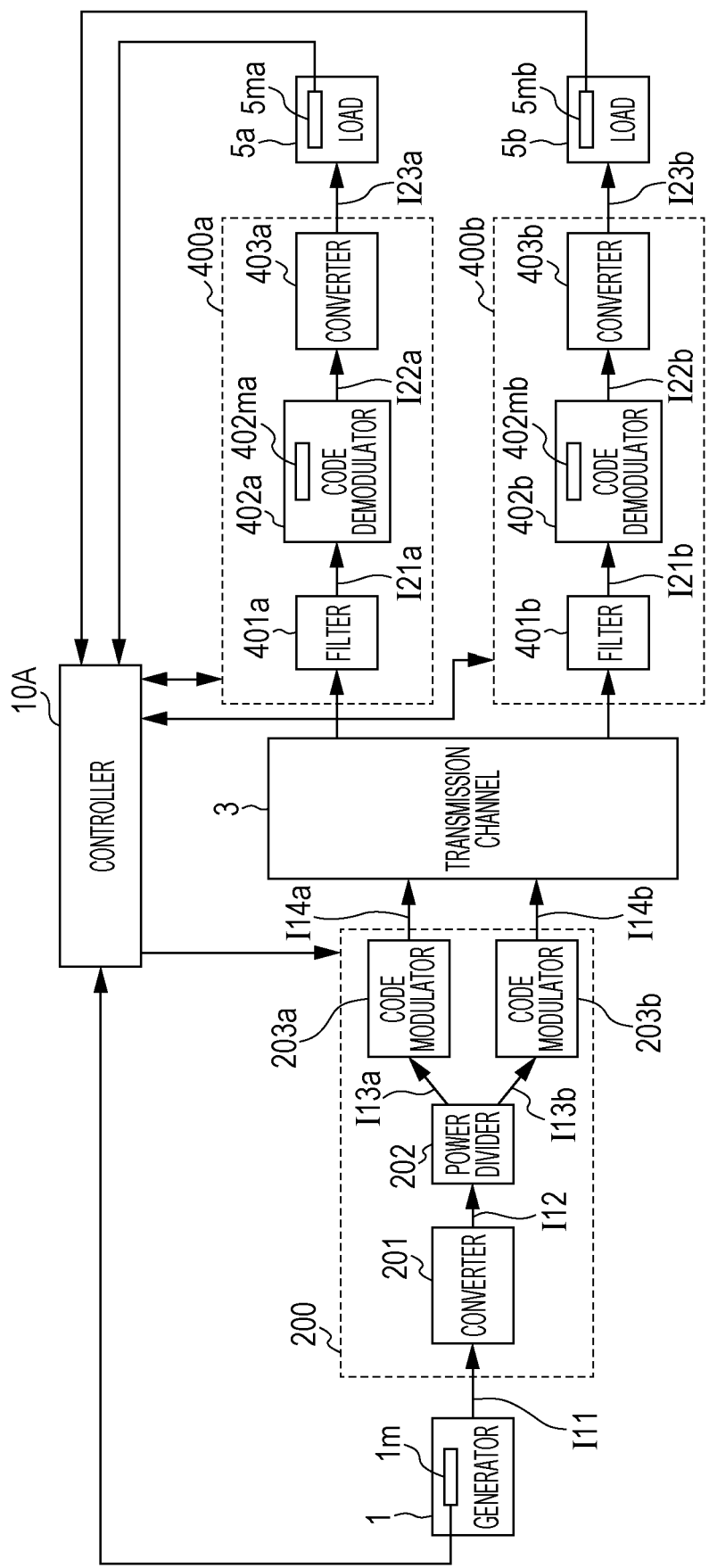
FIG. 11 is a block diagram showing a configuration example of a power transmission system according to a first embodiment.

FIG. 11 shows a configuration example of a power transmission system 100A according to the first embodiment. The power transmission system 100A is capable of transmitting power from a generator 1 to at least one of loads 5a, 5b.

The power transmission system 100A includes the generator 1, a power transmitting apparatus 200, a transmission channel 3, a power receiving apparatuses 400a, 400b, the loads 5a, 5b, and a controller 10A.

The power transmitting apparatus 200 includes a converter 201, a power divider 202, and code modulators 203a, 203b. The power receiving apparatus 400a includes a filter 401a, a code demodulator 402a, and a converter 403a. The power receiving apparatus 400b includes a filter 401b, a code demodulator 402b, and a converter 403b.

The generator 1, the code demodulators 402a, 402b, and the loads 5a, 5b respectively include power measuring instruments 1m, 402ma, 402mb, 5ma, 5mb.

[1-2. Controller]

The controller 10A includes a memory storing a program for generating various instruction signals, and a processor configured to execute the program, for example. The controller 10A further includes a communication circuit, for example.

The controller 10A transmits instruction signals to the power transmitting apparatus 200, and the power receiving apparatuses 400a, 400b. The instruction signal for the power transmitting apparatus 200 includes, for example, code information on a first modulation code to be used by the code modulator 203a, and code information on a second modulation code to be used by the code modulator 203b. The instruction signal for the power receiving apparatus 400a includes, for example, code information on a first demodulation code to be used by the code demodulator 402a. The instruction signal for the power receiving apparatus 400b includes, for example, code information on a second demodulation code to be used by the code demodulator 402b. The first modulation code corresponds to the first demodulation code, and the second modulation code corresponds to the second demodulation code.

The following descriptions will be provided on the assumption that: as an example, the first modulation code and the first demodulation code have a first code sequence in common; and the second modulation code and the second demodulation code have a second code sequence in common. In this case, the configuration may be such that: the controller 10A assigns unique code sequences to the power receiving apparatuses 400a, 400b, respectively; and the controller 10A further posts information on the thus-assigned code sequences to the power transmitting apparatus 200. Thereby, the first code sequence is set in the code modulator 203a and the code demodulator 402a in common, and the second code sequence is set in the code modulator 203b and the code demodulator 402b in common.

The first code sequence and the second code sequence are different from each other. The first code sequence and the second code sequence each may include an orthogonal code. Examples of the orthogonal code include an orthogonal Gold sequence and an orthogonal M-sequence.

The controller 10A may acquire information on the amount of power generated by the generator 1 from the power measuring instrument 1m. The controller 10A may acquire information on the amounts of powers consumed by the loads 5a, 5b from the power measuring instruments 5ma, 5mb. The controller 10A may acquire information on the amounts of powers received by the power receiving apparatuses 400a, 400b from the power measuring instruments 402ma, 402mb.

Based on the information, the controller 10A controls the power transmitting apparatus 200 and the power receiving apparatuses 400a, 400b. For example, based on the information on the amounts of powers consumed by the loads 5a, 5b and/or the information on the amounts of powers received by the power receiving apparatuses 400a, 400b, the controller 10A may set a ratio of the power division in the power divider 202.

[1-3. Generator]

The generator 1 generates the DC or AC power, and sends it to the power transmitting apparatus 200. The generator 1 for generating the DC power may be a photovoltaic power generator, for example. The generator 1 for generating the AC power may be a generator using the revolution of a turbine, for example. Examples of the AC power generator include a thermal power generator, a hydraulic power generator, a wind power generator, a nuclear power generator and a tidal power generator.

[1-4. Power Transmitting Apparatus]

The power transmitting apparatus 200 includes the converter 201, the power divider 202, and the code modulators 203a, 203b.

The converter 201 converts the generated power into an AC power at a predetermined frequency, and sends it to the power divider 202. In a case where the generated power is a DC power, the converter 201 is an inverter, for example. In a case where the generated power is an AC power, the converter 201 is a frequency converter, for example.

The power divider 202 divides the AC power into multiple divided powers using a predetermined division ratio. The multiple divided powers are sent to the code modulators 203a, 203b. The power divider 202 may include a resistance divider circuit, for example. The resistance divider circuit includes a first resistor placed between an input port and a first output port, and a second resistor placed between the input port and a second output port, for example. In this case, the power can be divided according to a ratio of a value of the resistance between the input port and the first output port to a value of the resistance between the input port and the second output port. Otherwise, the power divider 202 may include a transformer for the division. The transformer includes an input-side coil, and two output-side coils coupled to the input-side coil, for example. In this case, the power can be divided according to a ratio of a coefficient of coupling between the input-side coil and a first output-side coil to a coefficient of coupling between the input-side coil and a second output-side coil.

The code modulators 203a, 203b are each configured in the same manner as is the code modulator 2 described in the reference mode, for example. The code modulators 203a, 203b code-modulate the divided powers using their modulation codes including specified code sequences, respectively. For example, the code modulator 203a code-modulates the first divided power using the modulation code including the first code sequence, and outputs the code-modulated power to the transmission channel 3. The code modulator 203b code-modulates the second divided power using the modulation code including the second code sequence, and outputs the code-modulated power to the transmission channel 3.

[1-5. Transmission Channel]

These code-modulated powers are transmitted from the power transmitting apparatus 200 to the power receiving apparatuses 400a, 400b via the transmission channel 3 while multiplexed together on the transmission channel 3. The transmission channel 3 is a wired transmission line, for example.

[1-6. Power Receiving Apparatuses]

The power receiving apparatus 400a includes the filter 401a, the code demodulator 402a, and the converter 403a.

The power receiving apparatus 400b includes the filter 401b, the code demodulator 402b, and the converter 403b.

The filter 401a filters the power transmitted there to, and allows a power component at a predetermine frequency to pass there through. The filter 401a may be a passive filter or an active filter. The filter 401a may be an RC filter including a resistor and a capacitor, an RL filter including a resistor and an inductor, or an RLC circuit including a resistor, an inductor and a capacitor, for example. The filter 401a may include an operational amplifier and/or a transistor, for example. The filter 401a may be a digital filter and include an analog-to-digital converter, an arithmetic circuit, and a digital-to-analog converter, for example.

The code demodulator 402a is configured in the same manner as is the code demodulator 4 described in the reference mode, for example. The code demodulator 402a code-demodulates the filtered power using the demodulation code including the specified code sequence (e.g. the first code sequence), and sends the code-demodulated power to the converter 403a.

The converter 403a converts the code-demodulated power into a predetermined output power, and outputs it to the load 5a. FIG. 11 shows the converted power as an output current I23a. In a case where the code-demodulated power is a DC current, the converter 403a may be an inverter, for example, and is a DC-to-DC converter. In a case where the code-demodulated power is an AC current, the converter 403a is a frequency converter, for example.

The filter 401b, the code demodulator 402b and the converter 403b are configured in the same manners as are the filter 401a, the code demodulator 402a and the converter 403a, respectively. However, the code demodulator 402b code-demodulates the filtered power using the demodulation code including a code sequence (e.g. second code sequence) which is different from that used by the code demodulator 402a.

[1-7. Loads]

The loads 5a, 5b may be a load circuit, or a motor, for example.

[1-8. Supplement]

It should be noted that FIG. 11 shows a generated current I11, an AC current I12, a first divided current I13a, a second divided current I13b, a first modulated current I14a, a second modulated current I14b, a first filtered current I21a, a second filtered current I21b, a first demodulated current I22a, a second demodulated current I22b, a first output current I23a, and a second output current I23b instead of the generated power, the AC power, the first divided power, the second divided power, the first code-modulated power, the second code-modulated power, the first filtered power, the second filtered power, the first code-demodulated power, the second code-demodulated power, the first output power, and the second output power. Although the following descriptions will be provided for an example in which the currents are modulated and demodulated, the present disclosure is not limited to this. For example, the voltages may be modulated and demodulated. The "currents" in the following descriptions may be replaced with the "voltages" and "powers" whenever deemed necessary.

[2. Example of Operation]

FIGS. 12A to 12F show an example of how the power transmission system 100A operates. FIGS. 12A to 12F show examples of waveforms of the generated current I11, the first divided current I13a, the second divided current I13b, a transmitted current I20 (=I14a+I14b), the first demodulated current I22a, and the second demodulated current I22b, respectively.

The example of the operation is based on an assumption that: the power receiving apparatus 400a demands a 100 mA current; and the power receiving apparatus 400b demands a 50 mA current.

Figure 12A:
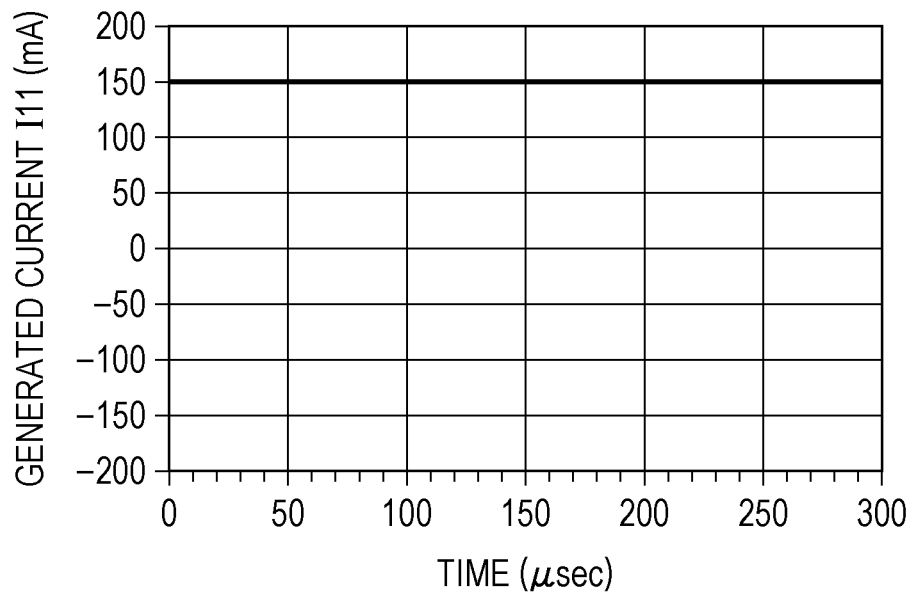
FIG. 12A is a diagram showing an example of a waveform of a generated current according to the first embodiment.

As shown in FIG. 12A, the generated current I11 was a DC current of 150 mA.

Figure 12B:
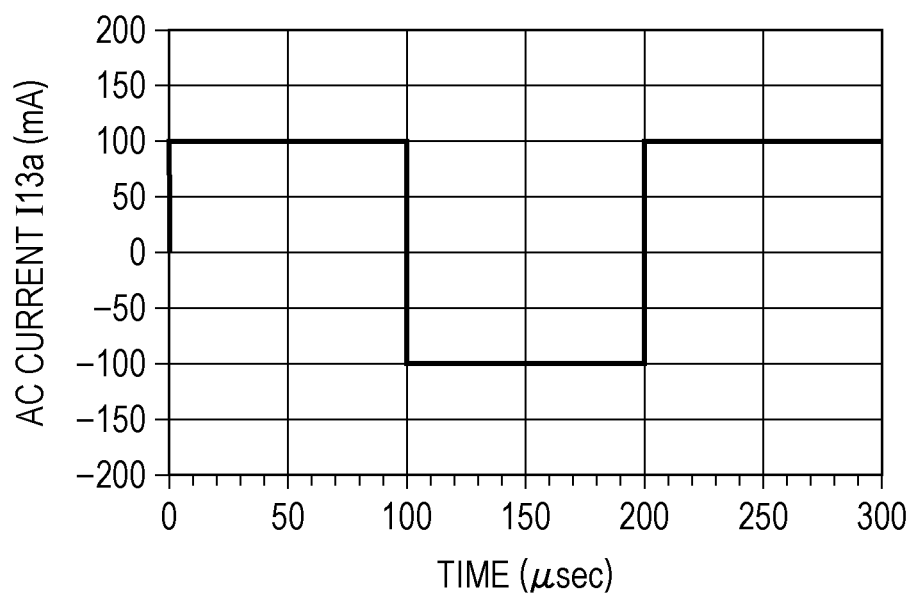
FIG. 12B is a diagram showing an example of a waveform of a first AC current according to the first embodiment.
Figure 12C:
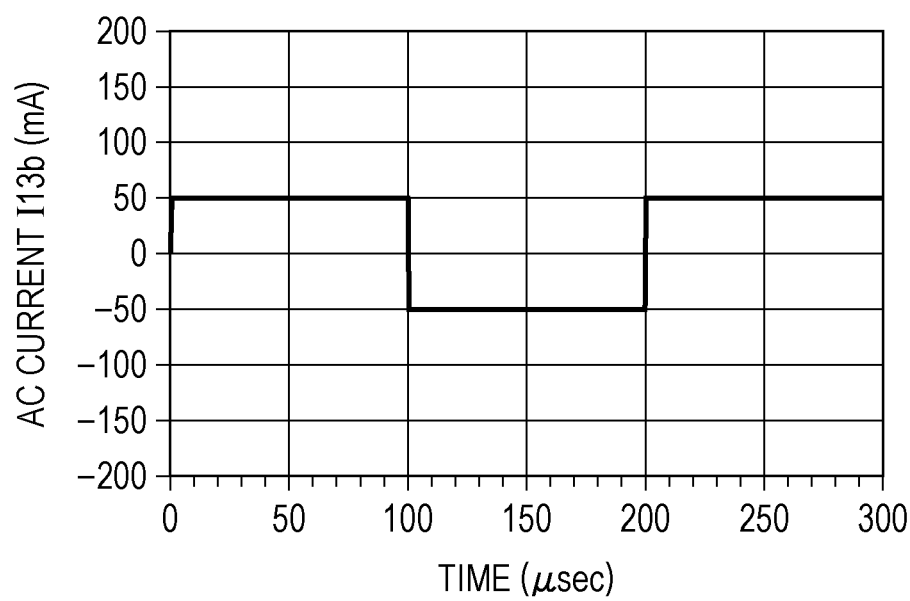
FIG. 12C is a diagram showing an example of a waveform of a second AC current according to the first embodiment.

The DC current I11 was converted into the AC current I12 at 5000 Hz. The AC current I12 was divided into the two AC currents I13a, I13b using a division ratio of 2 to 1. As shown in FIG. 12B, the AC current I13a had an amplitude of 100 mA. As shown in FIG. 12C, the AC current I13b had an amplitude of 50 mA. The AC current I13a was turned into the modulated current I14a by being code-modulated using the first code sequence. The AC current I13b was turned into the modulated current I14b by being code-modulated using the second code sequence. In this respect, the first code sequence and the second code sequence were orthogonal to each other.

Figure 12D:
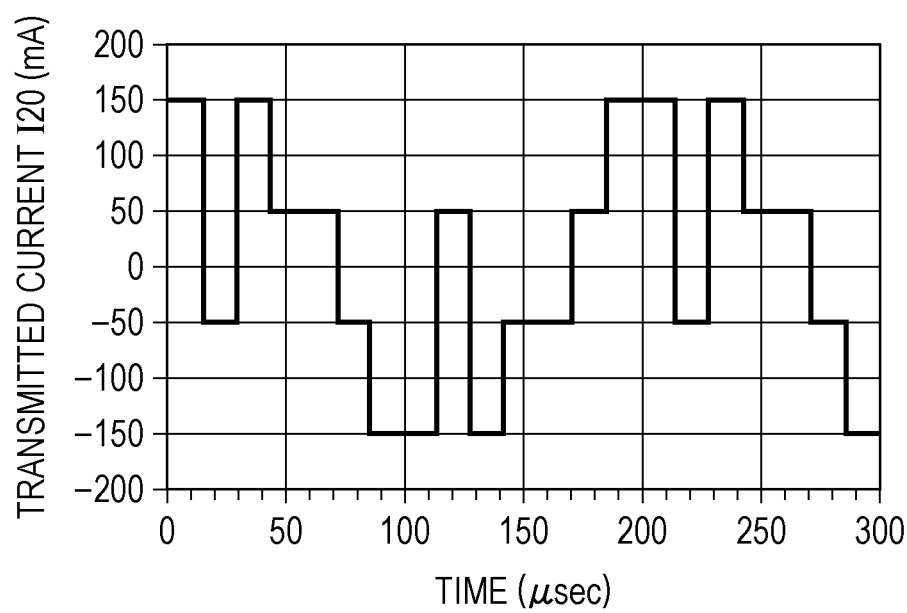
FIG. 12D is a diagram showing an example of a waveform of a transmitted current according to the first embodiment.

The modulated currents I14a, I14b were combined on the transmission channel 3, and were thus turned into the transmitted current I20. As shown in FIG. 12D, the transmitted current I20 changed in a range of −150 mA to 150 mA.

Figure 12E:
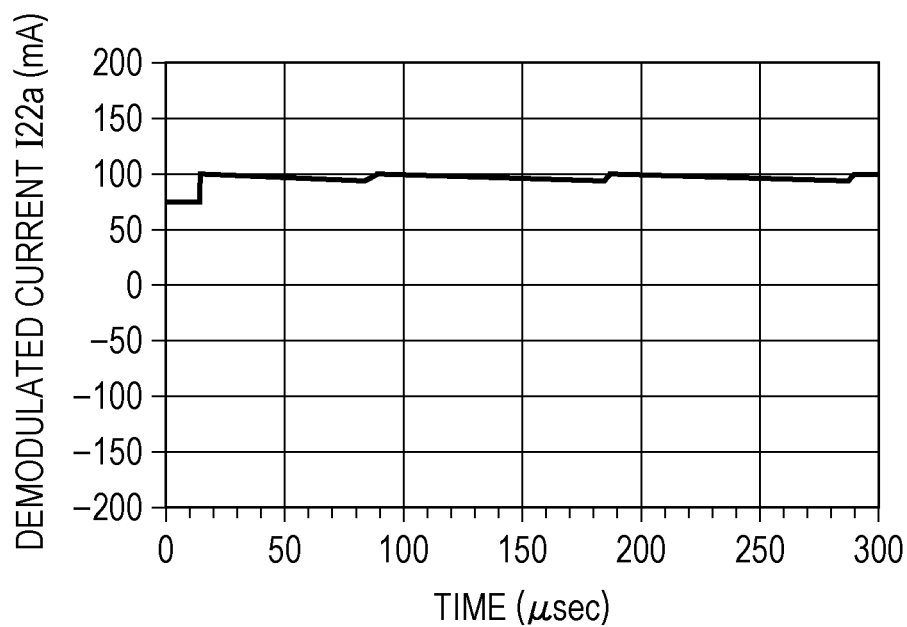
FIG. 12E is a diagram showing an example of a waveform of a first demodulated current according to the first embodiment.
Figure 12F:
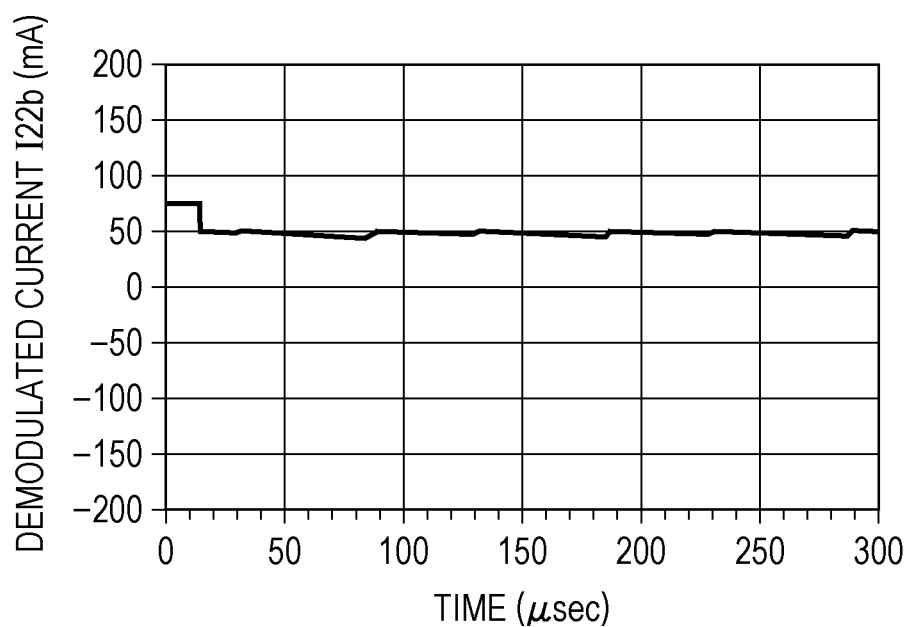
FIG. 12F is a diagram showing an example of a waveform of a second demodulated current according to the first embodiment.

Part of the transmitted current I20 was turned into the demodulated current I22a by being code-demodulated using the first code sequence. The other part of the transmitted current I20 was turned into the demodulated current I22b by being code-demodulated using the second code sequence. As shown in FIG. 12E, the demodulated current I22a was a DC current of 100 mA. As shown in FIG. 12F, the demodulated current I22b was a DC current of 50 mA.

[3. Effects]

The multiple code-modulated powers are identified, for example, based on the unique code sequences assigned to the power receiving apparatuses, respectively. This enables the multiple powers to be concurrently and independently transmitted via the common transmission channel. The sharing of the transmission channel among the multiple code-modulated powers makes it possible to decrease cables in number in a case where the transmission channel is formed from cables, for example. The concurrent transmission makes it possible to complete the transmission of the multiple powers within a shorter time than a time-division transmission, for example. Since the multiple powers are transmitted independently from each other, the transmission can be achieved without allowing the multiple powers to adversely affect each other.

The generated power can be selectively and flexibly divided depending on power demands from the multiple power receiving apparatuses and/or the multiple loads, for example. Changes in the power demands from the multiple loads can be flexibly dealt with by changing the power division ratio and the code sequences of the modulation codes on the transmission side. For example, even in a case where the number of patterns of pairing the modulation codes and the demodulation codes increases, it is possible to inhibit an increase in the size of the circuit. Accordingly, the power transmission can be achieved using a small-size apparatus.

Second Embodiment

Descriptions will be hereinbelow provided for what makes a second embodiment different from the reference mode and the first embodiment.

[1. Power Transmission System]
[1-1. Configuration of Power Transmission System]

Figure 13:
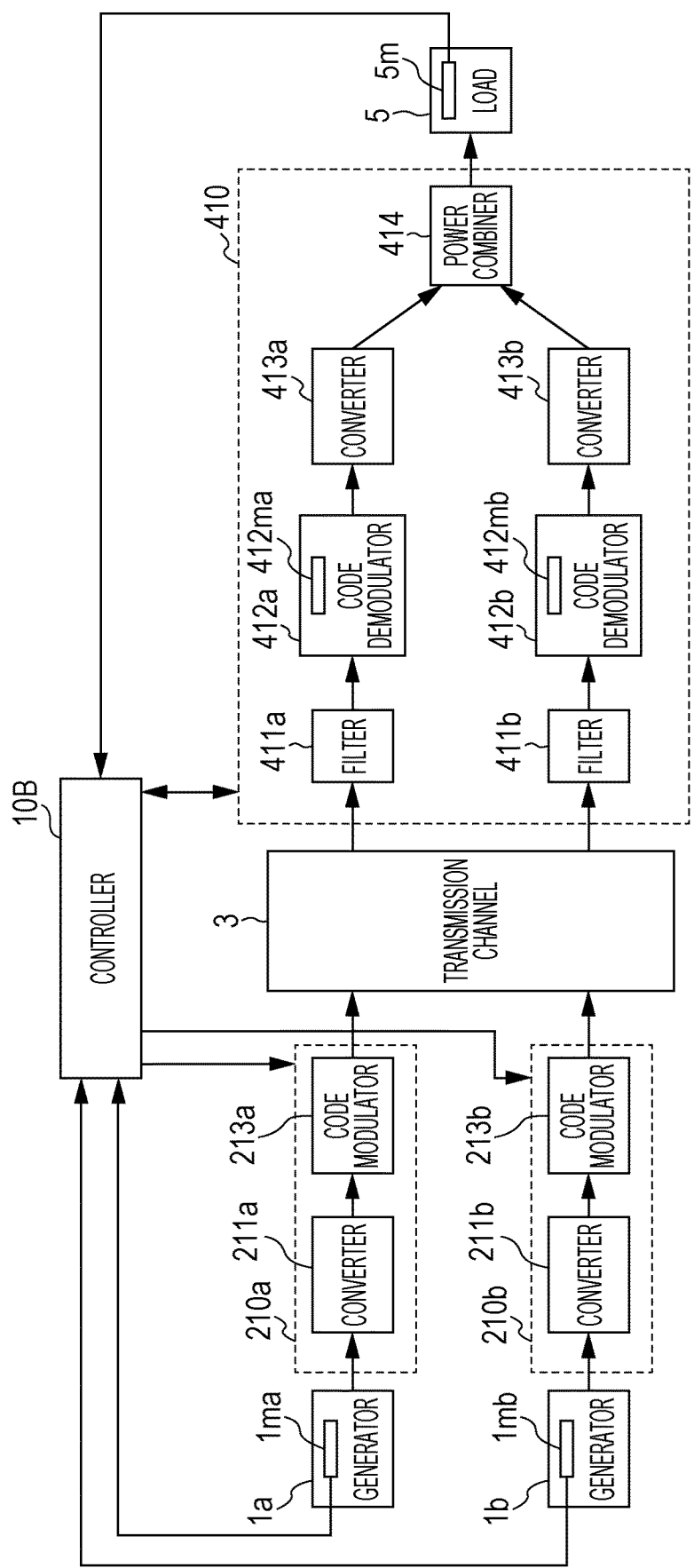
FIG. 13 is a block diagram showing a configuration example of a power transmission system according to a second embodiment.

FIG. 13 shows a configuration example of a power transmission system 100B according to a second embodiment. The power transmission system 100B is capable of transmitting power from at least one of generators 1a, 1b to a load 5.

The power transmission system 100B includes the generators 1a, 1b, power transmitting apparatuses 210a, 210b, the transmission channel 3, a power receiving apparatus 410, the load 5, and a controller 10B.

The power transmitting apparatus 210a includes a converter 211a and a code modulator 213a. The power transmitting apparatus 210b includes a converter 211b and a code modulator 213b. The power receiving apparatus 410 includes filters 411a, 411b, code demodulators 412a, 412b, converters 413a, 413b, and a power combiner 414.

The generators 1a, 1b, the code demodulators 412a, 412b and the load 5 respectively include power measuring instruments 1ma, 1mb, 412ma, 412mb, 5m.

[1-2. Controller]

The controller 10B includes a memory storing a program for generating various instruction signals, and a processor configured to execute the program, for example. The controller 10B further includes a communication circuit, for example.

The controller 10B transmits instruction signals to the power transmitting apparatuses 210a, 210b, and the power receiving apparatus 410. The instruction signal for the power transmitting apparatus 210a includes code information on a first modulation code to be used by the code modulator 213a. The instruction signal for the power transmitting apparatus 210b includes code information on a second modulation code to be used by the code modulator 213b. The instruction signal for the power receiving apparatus 410 includes, for example, code information on a first demodulation code to be used by the code demodulator 412a, and code information on a second demodulation code to be used by the code demodulator 412b. The first modulation code corresponds to the first demodulation code, and the second modulation code corresponds to the second demodulation code.

The following descriptions will be provided based on an assumption that as an example, the first and second modulation codes as well as the first and second demodulation codes have a common code sequence. In this case, the configuration may be such that: the controller 10B assigns a unique code sequence to the power receiving apparatus 410; and the controller 10B further posts information on the thus-assigned code sequence to the power transmitting apparatuses 210a, 210b. Thereby, the common code sequence is set in the code modulators 213a, 213b and the code demodulator 412a, 412b.

The controller 10B may acquire information on the amounts of powers generated by the generators 1a, 1b from the power measuring instruments 1ma, 1mb. The controller 10B may acquire information on the amount of power consumed by the load 5 from the power measuring instrument 5m. The controller 10B may acquire information on the amounts of power received by the power receiving apparatus 410 from the power measuring instruments 412ma, 412mb. The controller 10B may acquire information on the pass frequencies of the filters 411a, 411b from the power receiving apparatus 410. Otherwise, the controller 10B may acquire information on the frequencies of the code modulated powers from the power transmitting apparatuses 210a, 210b.

Based on the information, the controller 10B controls the power transmitting apparatuses 210a, 210b and the power receiving apparatus 410.

For example, based on the information on the amounts of powers generated by the generators 1a, 1b and/or the information on the amounts of powers received by the code demodulators 412a, 412b, the controller 10B may set a ratio of the power combination in the power combiner 414.

For example, based on the information on the pass frequencies of the filters 411a, 411b, the controller 10B may set the frequencies of the code-modulated powers generated by the power transmitting apparatuses 210a, 210b. Otherwise, based on the information on the frequencies of the code-modulated powers generated by the power transmitting apparatuses 210a, 210b, the controller 10B may set the pass frequencies of the filters 411a, 411b. Otherwise, the controller 10B may set the frequencies of the code-modulated powers generated by the power transmitting apparatuses 210a, 210b, and the pass frequencies of the filters 411a, 411b.

[1-3. Generators]

The generators 1a, 1b each are configured in the same manner as is the generator 1 described in the first embodiment.

[1-4. Power Transmitting Apparatuses]

The power transmitting apparatus 210a includes the converter 211a and the code modulator 213a. The power transmitting apparatus 210b includes the converter 211b and the code modulator 213b.

The converters 211a, 211b each are configured in the same manner as is the converter 201 described in the first embodiment. Incidentally, the AC current resulting from the conversion by the converter 211a has a first frequency, and the AC current resulting from the conversion by the converter 211b has a second frequency. The first frequency and the second frequency are different from each other.

The code modulators 213a, 213b each are configured in the same manner as is the code modulator 2 described in the reference mode, for example.

[1-5. Transmission Channel]

The code-modulated powers are transmitted from the power transmitting apparatuses 210a, 210b to the power receiving apparatus 410 via the transmission channel 3 while multiplexed together on the transmission channel 3. Since the code-modulated powers outputted from the power transmitting apparatuses 210a, 210b have their respective different frequencies, the code-modulated powers can be appropriately separated from each other by the power receiving apparatus 410. The transmission channel 3 is a wired transmission line, for example.

[1-6. Power Receiving Apparatus]

The power receiving apparatus 410 includes the filters 411a, 411b, the code demodulators 412a, 412b, the converters 413a, 413b, and the power combiner 414.

The filters 411a, 411b each are configured in the same manner as are the filters 401a, 401b described in the first embodiment. Incidentally, the filter 411a filters a power component at a first pass frequency, and the filter 411b filters a power component at a second pass frequency.

The code demodulators 412a, 412b each are configured in the same manner as is the code demodulator 4 described in the reference mode.

The converters 413a, 413b each are configured in the same manner as are the converters 403a, 403b described in the first embodiment.

The power combiner 414 combines the powers converted by the converters 413a, 413b, and outputs the combined power to the load 5. The power combiner 414 may include a resistor combination circuit, for example. The resistor combination circuit includes: a first resistor arranged between a first input port and an output port; and a second resistor arranged between a second input port and the output port, for example. Otherwise, the power combiner 414 may include a transformer for the combination. The transformer includes two input-side coils, and one output-side coil coupled to the input-side coils, for example.

[1-7. Load]

The load 5 is configured in the same manner as is the load 5 described in the reference mode or the first embodiment.

[2. Effects]

The multiple code-modulated powers are identified, for example, based on the unique frequencies assigned to the power receiving apparatuses, respectively. This enables the multiple powers to be concurrently and independently transmitted via the common transmission channel.

The multiple code-demodulated powers can be selectively and flexibly combined depending on the power supply from the multiple generator.

Third Embodiment

The third embodiment is a combination of the first and second embodiments. Descriptions will be hereinbelow provided for what makes the third embodiment different from the reference mode as well as the first and second embodiments.

[1. Power Transmission System]

[1-1. Configuration of Power Transmission System]

Figure 14:
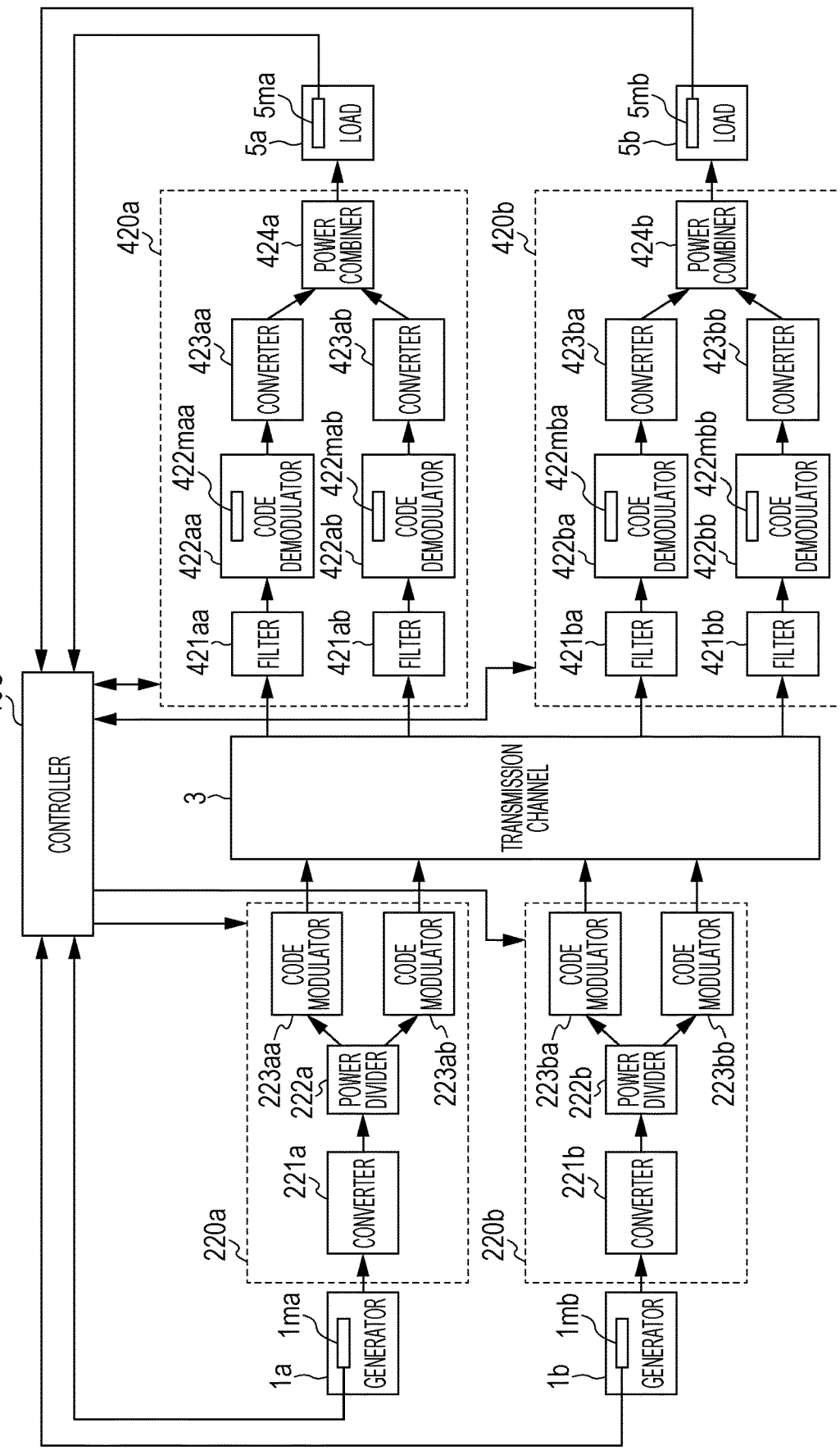
FIG. 14 is a block diagram showing a configuration example of a power transmission system according to a third embodiment.

FIG. 14 shows a configuration example of a power transmission system 100C according to the third embodiment. The power transmission system 100C is capable of transmitting power from at least one of generators 1a, 1b to at least one of loads 5a, 5b.

The power transmission system 100C includes the generators 1a, 1b, power transmitting apparatuses 220a, 220b, the transmission channel 3, power receiving apparatuses 420a, 420b, the loads 5a, 5b, and a controller 10C.

The power transmitting apparatus 220a includes a converter 221a, a power divider 222a, and code modulators 223aa, 223ab. The power transmitting apparatus 220b includes a converter 221b, a power divider 222b, and code modulators 223ba, 223bb. The power receiving apparatus 420a includes filters 421aa, 421ab, code demodulators 422aa, 422ab, converters 423aa, 423ab, and a power combiner 424a. The power receiving apparatus 420b includes filters 421ba, 421bb, code demodulators 422ba, 422bb, converters 423ba, 423bb, and a power combiner 424b.

The generators 1a, 1b, the code demodulators 422aa, 422ab, 422ba, 422bb, the loads 5a, 5b includes power measuring instruments 1ma, 1mb, 422maa, 422mab, 422mba, 422mbb, 5ma, 5mb, respectively.

[1-2. Controller]

The controller 10C includes a memory storing a program for generating various instruction signals, and a processor configured to execute the program, for example. The controller 10C further includes a communication circuit, for example.

The controller 10C transmits instruction signals to the power transmitting apparatuses 220a, 220b, and the power receiving apparatuses 420a, 420b. The instruction signal for the power transmitting apparatus 220a includes code information on a first modulation code to be used by the code modulator 223aa, and code information on a second modulation code to be used by the code modulator 223ab, for example. The instruction signal for the power transmitting apparatus 220b includes code information on a third modulation code to be used by the code modulator 223ba, and code information on a fourth modulation code to be used by the code modulator 223bb, for example. The instruction signal for the power receiving apparatus 420a includes code information on a first demodulation code to be used by the code demodulator 422aa, and code information on a second demodulation code to be used by the code demodulator 422ab, for example. The instruction signal for the power receiving apparatus 420b includes code information on a third demodulation code to be used by the code demodulator 422ba, and code information on a fourth demodulation code to be used by the code demodulator 422bb, for example. The first modulation code corresponds to the first demodulation code; the second modulation code corresponds to the third demodulation code; the third modulation code corresponds to the second demodulation code; and the fourth modulation code corresponds to the fourth demodulation code, for example.

The following descriptions will be provided based on an assumption that: as an example, the first and third modulation codes as well as the first and second demodulation codes have a common first code sequence; and the second and fourth modulation codes as well as the third and fourth demodulation codes have a common first code sequence. In this case, the configuration may be such that: the controller 10C assigns unique code sequences to the power receiving apparatuses 420a, 420b, respectively; and the controller 10C further posts information on the thus-assigned code sequences to the power transmitting apparatuses 220a, 220b, respectively.

The first code sequence and the second code sequence are different from each other. The first code sequence and the second code sequence each may include an orthogonal code. Examples of the orthogonal code include an orthogonal Gold sequence and an orthogonal M-sequence.

Each of the instruction signals for the power transmitting apparatuses 220a, 220b may include timing information on a timing for the code modulation. The timing information may be time information on a time at which to start the code modulation, and a time at which to terminate the code modulation. Each of the instruction signals for the power receiving apparatuses 420a, 420b may include timing information on a timing for the code demodulation. The timing information may be time information on a time at which to start the code demodulation, and a time at which to terminate the code demodulation.

The controller 10C may acquire information on the amounts of powers generated by the generators 1a, 1b from the power measuring instruments 1ma, 1mb. The controller 10C may acquire information on the amount of powers consumed by the loads 5a, 5b from the power measuring instruments 5ma, 5mb. The controller 10C may acquire information on the amounts of powers received by the power receiving apparatuses 420a, 420b from the power measuring instruments 422maa, 422mab, 422mba, 422mbb. The controller 10C may acquire information on the pass frequencies of the filters 421aa, 421ab, 421ba, 421bb from the power receiving apparatuses 420a, 420b. Otherwise, the controller 10C may acquire information on the frequencies of the code modulated powers from the power transmitting apparatuses 220a, 220b.

Based on the information, the controller 10C controls the power transmitting apparatuses 220a, 220b and the power receiving apparatuses 420a, 420b.

For example, based on the information on the pass frequencies of the filters 421aa, 421ab, 421ba, 421bb, the controller 10C may set the frequencies of the code-modulated powers to be generated by the power transmitting apparatuses 220a, 220b. Otherwise, based on the information on the frequencies of the code-modulated powers to be generated by the power transmitting apparatuses 220a, 220b, the controller 10C may set the pass frequencies of the filters 421aa, 421ab, 421ba, 421bb. Otherwise, the controller 10C may set: the frequencies of the code-modulated powers to be generated by the power transmitting apparatuses 220a, 220b; and the pass frequencies of the filters 421aa, 421ab, 421ba, 421bb.

The controller 10C may set a ratio of the power division in each of the power dividers 222a, 222b. This makes it possible to allocate powers from the generators 1a, 1b between the loads 5a, 5b with electric charges taken into consideration, for example. The controller 10C may set a ratio of the power combination in each of the power combiners 424a, 424b.

For example, by referring to the information in the amounts of powers generated by the generators 1a, 1b, the information on the amounts of powers received by the code demodulators 422aa, 422ab, 422ba, 422bb, and/or the information on the amounts of powers consumed by the loads 5a, 5b, the controller 10C is capable of identifying what amount of power has been transmitted from which generator to which load. This may be useful to sell and buy electric power as a business, for example.

[1-3. Generators]

The generators 1a, 1b each are configured in the same manner as is the generator 1 described in the first embodiment.

[1-4. Power Transmitting Apparatuses]

The power transmitting apparatus 220a is configured in the same manner as is the power transmitting apparatus 200 described in the first embodiment. The converter 221a converts the generated power into an AC current with a first frequency. The code modulator 223aa code-modulates the first divided power using the first code sequence, and the code modulator 223ab code-modulates the second divided power using the second code sequence.

The power transmitting apparatus 220b is configured in the same manner as is the power transmitting apparatus 200 described in the first embodiment. The converter 221b converts the generated power into an AC current with a second frequency. The first frequency and the second frequency are different from each other. The code modulator 223ba code-modulates the first divided power using the first code sequence, and the code modulator 223bb code-modulates the second divided power using the second code sequence.

[1-5. Transmission Channel]

The code-modulated powers are transmitted from the power transmitting apparatuses 220a, 220b to the power receiving apparatuses 420a, 420b via the transmission channel 3 while multiplexed together on the transmission channel 3. Since the code-modulated powers outputted from the power transmitting apparatuses 220a, 220b have their respective different frequencies, the code-modulated powers can be appropriately separated by the power receiving apparatuses 420a, 420b although multiplexed together on the transmission channel 3. The transmission channel 3 is a wired transmission line, for example.

[1-6. Power Receiving Apparatuses]

The power receiving apparatus 420a is configured in the same manner as is the power receiving apparatus 410 described in the second embodiment. The filter 421*aa* allows a power component with a first pass frequency to pass therethrough, and the code demodulator 422*aa* code-demodulates the thus-filtered power component using the first code sequence. The filter 421*ab* allows a power component with a second pass frequency to pass therethrough, and the code demodulator 422*ab* code-demodulates the thus-filtered power component using the first code sequence.

The power receiving apparatus 420*b* is configured in the same manner as is the power receiving apparatus 410 described in the second embodiment. The filter 421*ba* allows a power component with the first pass frequency to pass therethrough, and the code demodulator 422*ba* code-demodulates the thus-filtered power component using the second code sequence. The filter 421*bb* allows a power component with the second pass frequency to pass therethrough, and the code demodulator 422*bb* code-demodulates the thus-filtered power component using the second code sequence.

[1-7. Loads]

The loads 5*a*, 5*b* each are configured in the same manner as is the load 5 described in the reference mode or the first embodiment.

[2. Operation]

Figure 15:
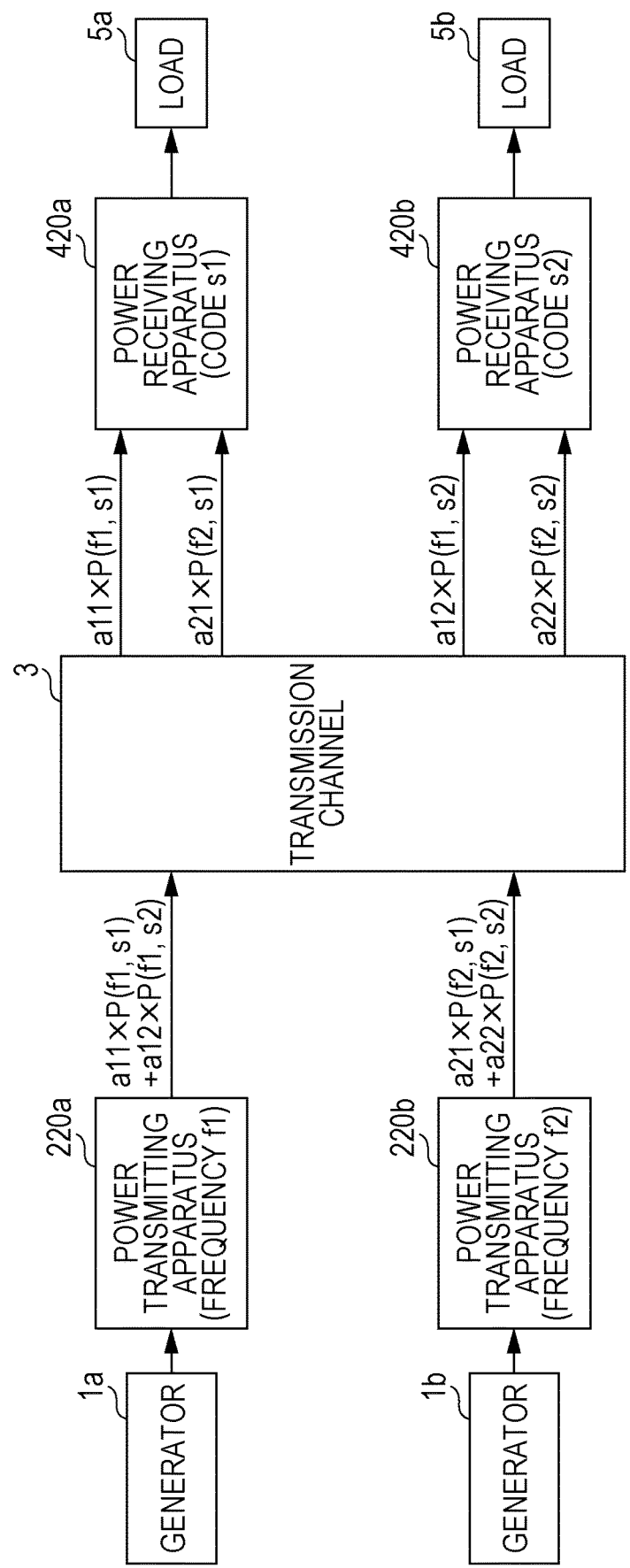
FIG. 15 is a schematic diagram of the power transmission system according to the third embodiment.

Referring to FIG. 15, descriptions will be provided for how the power transmission system 100C performs the power transmission.

In FIG. 15, reference sign f1 denotes a unique frequency set for the power transmitting apparatus 220*a*; reference sign f2 denotes a unique frequency set for the power transmitting apparatus 220*b*; reference sign s1 denotes a unique code sequence set for the power receiving apparatus 420*a*; and reference sign s2 denotes a unique code sequence set for the power receiving apparatus 420*b*.

The power transmitting apparatus 220*a* outputs a power P(f1, s1) having the frequency f1, and code-modulated using the code sequence s1, as well as outputs a power P(f1, s2) having the frequency f1, and code-modulated using the code sequence s2. A coefficient a11 of the power P(f1, s1) and a coefficient a12 of the power P(f1, s2) represents a power division ratio, and satisfies $a11^2+a12^2=1$, for example.

The power transmitting apparatus 220*b* outputs a power P(f2, s1) having the frequency f2, and code-modulated using the code sequence s1, as well as outputs a power P(f2, s2) having the frequency f2, and code-modulated using the code sequence s2. A coefficient a21 of the power P(f2, s1) and a coefficient a22 of the power P(f2, s2) represents a power division ratio, and satisfies $a21^2+a22^2=1$, for example.

The power receiving apparatus 420*a* receives a power a11×P(f1, s1)+a21×P(f2, s1), and sends it to the load 5*a*.

The power receiving apparatus 420*b* receives a power a12×P(f1, s2)+a22×P(f2, s2), and sends it to the load 5*b*.

[3. Effects]

The multiple code-modulated powers are identified, respectively, based on the combination of the unique frequencies assigned to the power transmitting apparatuses and the unique code sequences assigned to the power receiving apparatuses, for example. This enables the multiple powers to be concurrently and independently transmitted via the common transmission channel.

The generated powers from the multiple generators can be selectively and flexibly supplied to the multiple loads, for example, depending on the power supplies from the multiple generators and the power demands from the multiple loads.

[4. Modifications]

[4-1. First Modification]

Figure 16:
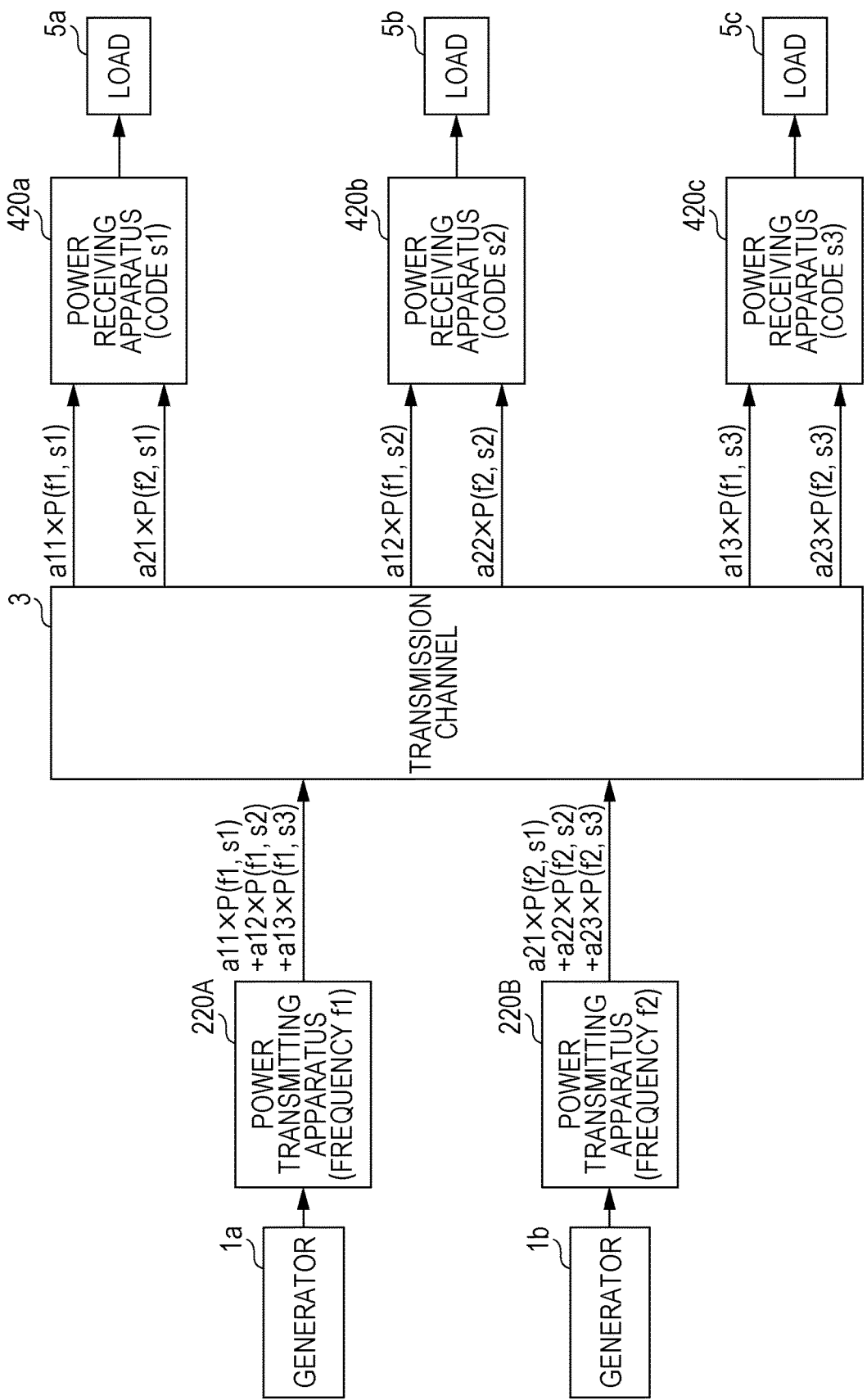
FIG. 16 is a schematic diagram of a power transmission system according to a first modification of the third embodiment.

FIG. 16 is a schematic diagram of a power transmission system 100D of a first modification of the third embodiment.

The power transmission system 100D shown in FIG. 16 includes the generators 1*a*, 1*b*, power transmitting apparatuses 220A, 220B, the transmission channel 3, power receiving apparatuses 420*a*, 420*b*, 420*c*, and loads 5*a*, 5*b*, 5*c*.

Each of the power transmitting apparatuses 220A, 220B divides its generated power into three parts, and code-modulates the three thus-divided powers. In the other respects, the power transmitting apparatuses 220A, 220B are configured in the same manner as are the above-described power transmitting apparatuses 220*a*, 220*b*.

The power receiving apparatus 420*c* is configured in the same manner as are the power receiving apparatuses 420*a*, 420*b*. In FIG. 16, reference sign s3 denotes a unique code sequence set for the power receiving apparatus 420*c*.

The load 5*c* is configured in the same manner as are the loads 5*a*, 5*b*.

The power transmitting apparatus 220A outputs: a power P(f1, s1) having a frequency f1, and code-modulated using a code sequence s1; a power P(f1, s2) having the frequency f1, and code-modulated using a code sequence s2; and a power P(f1, s3) having the frequency f1, and code-modulated using the code sequence s3. A coefficient a11 of the power P(f1, s1), a coefficient a12 of the power P(f1, s2) and a coefficient a13 of the power P(f1, s3) represent a power division ratio, and satisfy $a11^2+a12^2+a13^2=1$, for example.

The power transmitting apparatus 220B outputs: a power P(f2, s1) having a frequency f2, and code-modulated using the code sequence s1; a power P(f2, s2) having the frequency f2, and code-modulated using the code sequence s2; and a power P(f2, s3) having the frequency f2, and code-modulated using the code sequence s3. A coefficient a21 of the power P(f2, s1), a coefficient a22 of the power P(f2, s2) and a coefficient a23 of the power P(f2, s3) represent a power division ratio, and satisfy $a21^2+a22^2+a23^2=1$, for example.

The power receiving apparatus 420*c* receives a power a13×P(f1, s3)+a23×P(f2, s3), and sends it to the load 5*c*.

[4-2. Second Modification]

Figure 17:
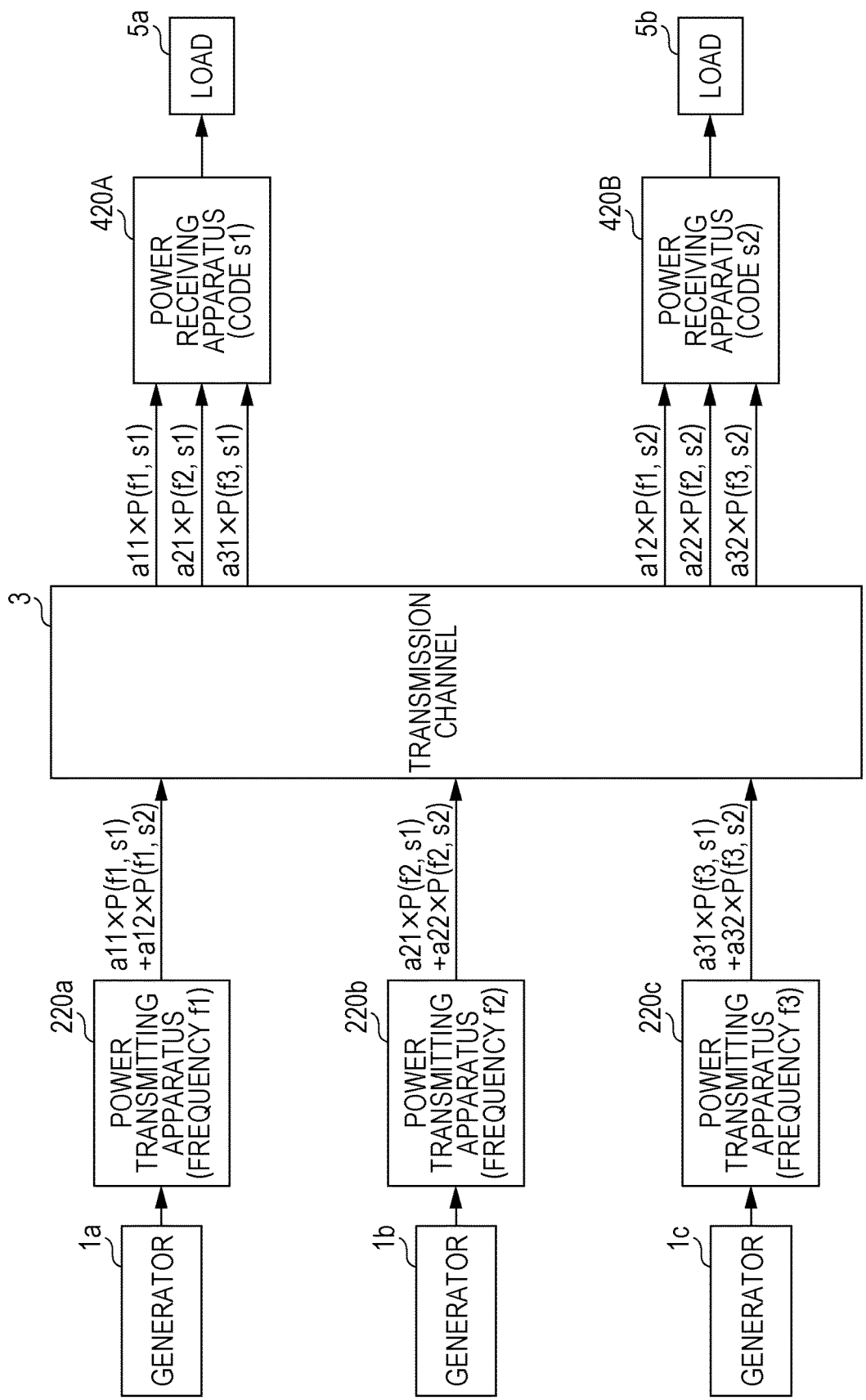
FIG. 17 is a schematic diagram of a power transmission system according to a second modification of the third embodiment.

FIG. 17 is a schematic diagram of a power transmission system 100E of a second modification of the third embodiment.

The power transmission system 100E shown in FIG. 17 includes generators 1*a*, 1*b*, 1*c*, power transmitting apparatuses 220*a*, 220*b*, 220*c*, the transmission channel 3, power receiving apparatuses 420A, 420B, and the loads 5*a*, 5*b*.

The generator 1*c* is configured in the same manner as are the generators 1*a*, 1*b*.

The power transmitting apparatus 220*c* is configured in the same manner as are the power transmitting apparatuses 220*a*, 220*b*. In FIG. 17, reference sign f3 denotes a unique frequency set for the power transmitting apparatus 220*c*.

The power receiving apparatuses 420A, 420B receive powers from the power transmitting apparatuses 220*a*, 220*b*, 220*c*, and code-demodulate the powers. In the other respect, the power receiving apparatuses 420A, 420B are configured in the same manner as are the above-described power receiving apparatuses 420*a*, 420*b*.

The power transmitting apparatus 220*c* outputs: a power P(f3, s1) having the frequency f3, and code-modulated using the code sequence s1; and a power P(f3, s2) having the frequency f3, and code-modulated using the code sequence s2. A coefficient a31 of the power P(f3, s1) and a coefficient a32 of the power P(f3, s2) represent a power division ratio, and satisfy $a31^2+a32^2=1$, for example.

The power receiving apparatus 420A receives a power a11×P(f1, s1)+a21×P(f2, s1)+a31×P(f3, s1), and sends it to the load 5a. The power receiving apparatus 420B receives a power a12×P(f1, s2)+a22×P(f2, s2)+a32×P(f3, s2), and sends it to the load 5b.

Other Embodiments

The present disclosure is not limited to the specific examples described in the foregoing reference mode and embodiments. The techniques disclosed herein are not limited to the specific examples in the reference mode and embodiments. The present disclosure further includes modes to be obtained by making changes, replacements, additions, omissions, etc. to and from the reference mode and embodiments. In addition, the present disclosure includes modes to be obtained by combining some of the multiple embodiments and/or the reference mode.

The number of generators included in the power transmission system, or the number of loads included in the power transmission system is not limited to that exemplified by the first, second or third embodiment. The power transmission system may include four or more generators, and four or more loads. For example, in a case where the power transmission system includes N1 generators and N2 loads, the power transmission system may include N1×N2 code modulators, and N1×N2 code demodulators.

The number of power transmitting apparatuses included in the power transmission system, or the number of power receiving apparatuses included in the power transmission system is not limited to that exemplified by the first, second or third embodiment. The number of code modulators included in one power transmitting apparatus is optional, and the number of code demodulators included in one power receiving apparatus is optional.

The power transmitting apparatuses exemplified in the first, second and third embodiments may be used in any power transmission system, and their use is not limited to a specific system. Similarly, the power receiving apparatuses exemplified in the first, second and third embodiments may be used in any power transmission system, and their use is not limited to a specific system. The controllers exemplified in the first, second and third embodiments may be used in any power transmission system, and their use is not limited to a specific system.

Although in the first, second and third embodiments, the controller is described as being outside the power transmitting apparatus(es) and the power receiving apparatus(es), the present disclosure is not limited to what is described therein. The functions of the controller may be incorporated in at least one of the power transmitting apparatuses and/or the power receiving apparatuses.

In each of the first, second and third embodiments, the filters are optional components. Accordingly, the filters may be omitted.

For example, the filters 401a, 401b may be omitted from the power transmission system 100A shown in FIG. 11.

For example, the filters 411a, 411b may be omitted from the power transmission system 100B shown in FIG. 13. In this case, for example, the configuration may be such that: the code sequences of the modulation codes used by the code modulators 213a, 213b are different from each other; and the code sequences of the demodulation codes used by the code demodulators 412a, 412b are different from each other.

For example, the filters 421aa, 421ab, 421ba, 421bb may be omitted from the power transmission system 100C shown in FIG. 14. In this case, for example, the configuration may be such that: the code sequences of the modulation codes used by the code modulators 223aa, 223ab, 223ba, 223bb are different from one another; and the code sequences of the demodulation codes used by the code demodulators 422aa, 422ab, 422ba, 422bb are different from one another.

In each of the first, second and third embodiments, the converters in the power receiving apparatuses are optional components. Accordingly, the converters may be omitted.

Although in the reference mode, the code length of the control signals, the modulation codes and the demodulation codes are 14 bits, the code lengths of the present disclosure is not limited to the 14 bits. The longer the bit length becomes, the larger the number of orthogonal codes to be generated becomes. In addition, the longer code length makes the correlations smaller, and the power separation accordingly can be performed more accurately. This is also the case with the first, second and third embodiments referring to the reference mode.

Although in the reference mode, the code modulator and the code demodulator are described respectively as the circuits shown in FIGS. 6 and 7, the code modulators or the code demodulators of the present disclosure is not limited to what is shown in FIG. 6 or FIG. 7. For example, in a case where the power generated by each generator and the power demanded by each load are DC powers, the configuration may be such that the switches S21 to S24 may be omitted from the H-bridge circuit 23 shown in FIG. 6; and the switches S31 to S33 may be omitted from the H-bridge circuit 33 shown in FIG. 7. In this case, the circuit configuration of each code modulator and the circuit configuration of each code demodulator are simplified. Accordingly, a reduction in costs and a reduction in the sizes of each code modulator and each code demodulator can be achieved. This is also the case with the first, second and third embodiments referring to the reference mode.

The generated powers in the reference mode as well as the first, second and third embodiments are examples of the "input powers" in the present disclosure.

Overviews of Embodiments

A power transmitting apparatus of a first aspect is a power transmitting apparatus which transmits a power to at least one of power receiving apparatuses via a wired transmission channel, and each of the at least one power receiving apparatus is provided with at least one unique code sequence, code sequences unique to the respective power receiving apparatuses being different from one power receiving apparatus to another. The power transmitting apparatus includes: a frequency converter which converts the frequency of a power obtained from a power source into a predetermined frequency unique to the power transmitting apparatus; a power divider which divides the frequency-converted power into a or multiple powers; and at least one code modulator which code-modulates the divided powers using a code sequence of a power receiving apparatus to which to transmit the power which is among the at least one power receiving apparatus.

A power transmitting apparatus of a second aspect is the power transmitting apparatus of the first aspect, wherein the code sequence is a predetermined orthogonal code.

A power transmitting apparatus of a third aspect is the power transmitting apparatus of the first or second aspect, wherein the power obtained from the power source is a DC power.

A power transmitting apparatus of a fourth aspect is the power transmitting apparatus of the first or second aspect, wherein the power obtained from the power source is an AC power.

A power transmitting apparatus of a fifth aspect is the power transmitting apparatus of any one of the first to fourth aspects, wherein the power divider divides the frequency-converted power depending on power demands from the power receiving apparatuses to which to transmit the power.

A power receiving apparatus of a sixth aspect is a power receiving apparatus which receives a power from at least one of power transmitting apparatuses via a wired transmission channel, and the at least one power transmitting apparatus transmits the power with a frequency unique to the at least one power transmitting apparatus, frequencies unique to the respective power transmitting apparatuses being different from one power transmitting apparatus to another. The power receiving apparatus includes at least one code demodulator which receives the power code-modulated using one of at least one predetermined code sequence unique to the power receiving apparatus, and code-demodulates the power using the one code sequence.

A power receiving apparatus of a seventh aspect is the power receiving apparatus of the sixth aspect, further including at least one filter which allows powers with frequencies of power transmitting apparatuses from which the power receiving apparatus receives the powers to pass through the at least one filter, the power transmitting apparatuses being those among the at least one power transmitting apparatus, wherein each of the at least one code demodulator code-demodulates a power having passed through one of the at least one filter using a common predetermined code sequence unique to the power receiving apparatus.

A power receiving apparatus of an eighth aspect is the power receiving apparatus of the sixth aspect, further including multiple code demodulators, wherein each of the multiple code demodulators performs the code demodulation using one of multiple code sequences different from one code modulator to another.

A power receiving apparatus of a ninth aspect is the power receiving apparatus of any one of the sixth to eighth aspects, wherein the code sequence is a predetermined orthogonal code.

A power transmission system of a tenth aspect includes: at least one power transmitting apparatus of any one of the first to fifth aspects; and at least one power receiving apparatus of any one of the sixth to ninth aspects.

A power transmission system of an eleventh aspect is the power transmission system of the tenth aspect, including a controller which controls the at least one power transmitting apparatus and the at least one power receiving apparatus, wherein the controller sends to the code modulator, a control signal for posting a content of the code sequence, as well as a time at which to start the code modulation and a time at which to terminate the code modulation, and to the code demodulator, a control signal for posting the content of the code sequence, as well as a time at which to start the code demodulation and a time at which to terminate the code demodulation, and based on the control signal, the code modulator generates the code sequence, and code-modulates the divided power, and based on the control signal, the code demodulator generates the code sequence, and code-demodulates the power having passes through the filter.

A power transmission system of an aspect of the present disclosure is a power transmitter which transmits a power from at least one generator to an electric installation as at least one load. The power transmitter includes a code modulator which code-modulates the power generated by the generator, and a code demodulator which code-demodulates the power code-modulated by the code modulator, and supplies the code-demodulated power to the electric installation. The power transmitter is capable of transmitting the power generated by the generator to a desired electric installation by: causing the code modulator to code-modulate the generated power using a pre-set code sequence; and causing the code demodulator to code-demodulate the code-modulated power using the pre-set code sequence.

Furthermore, in case where there are multiple generators and multiple electric installations as the loads, the power transmitter includes frequency converters which each convert the frequency of a power generated by a corresponding generator, and power dividers which each divide the frequency-converted power. The power transmitter gives a pre-set unique frequency to the power generated by each generator, divides the power into desired powers, and gives a pre-set unique orthogonal code to each of the generators and electric installations. Thereby, the code modulator is capable of code-modulating the powers to be transmitted. Accordingly, the multiple electric installations can be simultaneously supplied with their powers.

Furthermore, since the unique frequency is given to the power generated by each generator, it is possible to identify how much power has been transmitted from which generator to which electric installation.

The foregoing aspects can provide the power transmission system which more securely identifies and divides the transmitted powers.

The power transmission system related to the present disclosure may be useful to transmit powers from generators, such as solar photovoltaic generators, wind generators and hydraulic generators, to railroad vehicles, electric vehicles, and the like.

What is claimed is:

1. A power transmitting apparatus comprising:
a converter which converts an input power into an AC power with a frequency; and
a first code modulator which code-modulates at least part of the AC power with a first modulation code to generate a first code-modulated power,
wherein in code-modulation, the first code modulator determines whether or not to reverse a direction of a current of the at least part of the AC power according to whether each bit of the first modulation code is a first value or a second value.

2. The power transmitting apparatus according to claim 1, further comprising:
a power divider which divides the AC power into a plurality of divided powers including a first divided power, which is the at least part of the AC power, and a second divided power; and
a second code modulator which code-modulates the second divided power with a second modulation code to generate a second code-modulated power.

3. The power transmitting apparatus according to claim 2, wherein:
the first code modulator includes
a first bridge circuit including a plurality of first switches, and a first control circuit which generates a plurality of first control signals for turning on and off the plurality of first switches;

the second code modulator includes
a second bridge circuit including a plurality of second switches, and
a second control circuit which generates a plurality of second control signals for turning on and off the plurality of second switches;

the first bridge circuit code-modulates the first divided power according to the plurality of first control signals; and the second bridge circuit code-modulates the second divided power according to the plurality of second control signals.

4. The power transmitting apparatus according to claim 3, wherein
each of the plurality of first switches and the plurality of second switches is a bidirectional switch.

5. The power transmitting apparatus according to claim 2, wherein
the first modulation code and the second modulation code are different from each other.

6. The power transmitting apparatus according to claim 2, wherein
the power transmitting apparatus acquires information on power demand from a power transmission destination, and
a ratio of power division by the power divider is set based on the information.

7. The power transmitting apparatus according to claim 2, wherein
the first modulation code corresponds to a first code sequence unique to a first power receiving apparatus,
the second modulation code corresponds to a second code sequence unique to a second power receiving apparatus, and
the power transmitting apparatus multiplexes a plurality of code-modulated powers including the first code-modulated power and the second code-modulated power, and transmits the multiplexed powers to a plurality of power receiving apparatuses including the first power receiving apparatus and the second power receiving apparatus via a transmission channel.

8. The power transmitting apparatus according to claim 1, wherein
the converter is an inverter or a frequency converter.

9. The power transmitting apparatus according to claim 1, wherein
the first modulation code includes an orthogonal code.

10. The power transmitting apparatus according to claim 1, wherein
the input power is a DC power or an AC power.

11. A power receiving apparatus comprising:
a first filter which filters an input power including a plurality of code-modulated powers to output a first filtered power with a first frequency; and
a first code demodulator which code-demodulates the first filtered power with a first demodulation code to generate a first code-demodulated power,
wherein in code-demodulation, the first code demodulator determines whether or not to reverse a direction of a current of the first filtered power according to whether each bit of the first demodulation code is a first value or a second value.

12. The power receiving apparatus according to claim 11, further comprising:
a second filter which filters the input power to output a second filtered power with a second frequency different from the first frequency;
a second code demodulator which code-demodulates the second filtered power with a second demodulation code to generate a second code-demodulated power; and
a power combiner which combines the first code-demodulated power and the second code-demodulated power.

13. The power receiving apparatus according to claim 12, wherein:
the first code demodulator includes
a first bridge circuit including a plurality of first switches, and
a first control circuit which generates a plurality of first control signals for turning on and off the plurality of first switches;

the second code demodulator includes
a second bridge circuit including a plurality of second switches, and
a second control circuit which generates a plurality of second control signals for turning on and off the plurality of second switches;

the first bridge circuit code-demodulates the first filtered power according to the plurality of first control signals; and the second bridge circuit code-demodulates the second filtered power according to the plurality of second control signals.

14. The power receiving apparatus according to claim 13, wherein
each of the plurality of first switches and the plurality of second switches is a bidirectional switch.

15. The power receiving apparatus according to claim 12, wherein
the first demodulation code and the second demodulation code are different from each other.

16. The power receiving apparatus according to claim 12, wherein
each of the first code-demodulated power and second code-demodulated power is an AC power.

17. The power receiving apparatus according to claim 12, wherein
the first frequency is a frequency unique to a first power transmitting apparatus,
the second frequency is a frequency unique to a second power transmitting apparatus, and
the input power includes
a first code-modulated power with the first frequency which is transmitted from the first power transmitting apparatus, and
a second code-modulated power with the second frequency which is transmitted from the second power transmitting apparatus.

18. The power receiving apparatus according to claim 11, wherein
the first demodulation code includes an orthogonal code.

* * * * *